United States Patent
Chinwalla et al.

(10) Patent No.: US 10,721,940 B2
(45) Date of Patent: Jul. 28, 2020

(54) METHODS FOR REDUCING VISCOSITY AND DELAYING ONSET OF COLD GELATION OF HIGH SOLIDS CONCENTRATED MILK PRODUCTS

(75) Inventors: Ammar N. Chinwalla, Gurnee, IL (US); Bruce E. Campbell, Glenview, IL (US); Rodrigo R. Roesch, Green Bay, WI (US); Yinqing Ma, Bethesda, MD (US); Julia Lee Gregg, Munich (DE); Virgil L. Metzger, Vernon Hills, IL (US); Brian M. Reinhart, Streamwood, IL (US)

(73) Assignee: Kraft Food Group Brands LLC, Chicago, IL (US)

( * ) Notice: Subject to any disclaimer, the term of this patent is extended or adjusted under 35 U.S.C. 154(b) by 37 days.

(21) Appl. No.: 13/554,604

(22) Filed: Jul. 20, 2012

(65) Prior Publication Data
US 2013/0022729 A1    Jan. 24, 2013

Related U.S. Application Data

(60) Provisional application No. 61/510,359, filed on Jul. 21, 2011.

(51) Int. Cl.
*A23C 3/02* (2006.01)
*A23C 9/142* (2006.01)
*A23C 9/152* (2006.01)

(52) U.S. Cl.
CPC ............ *A23C 9/1422* (2013.01); *A23C 9/152* (2013.01); *A23C 9/1522* (2013.01)

(58) Field of Classification Search
USPC ........................................................ 426/587
See application file for complete search history.

(56) References Cited

U.S. PATENT DOCUMENTS 2,135,054 A * 11/1938 Schwartz ............. A23C 9/1522
                                                        423/315
4,018,752 A    4/1977 Bohren
(Continued)

FOREIGN PATENT DOCUMENTS

WO    1982001806    6/1982
WO    1983003523    10/1983
(Continued)

OTHER PUBLICATIONS

"Report on the Work and Expenditures of the Agricultural Experiment Stations" U.S. Department of Agriculture, 1920, p. 59.*
(Continued)

*Primary Examiner* — Nikki H. Dees
*Assistant Examiner* — Amber M Cox
(74) *Attorney, Agent, or Firm* — Fitch, Even, Tabin & Flannery LLP

(57) ABSTRACT

Methods are provided for treating high solids concentrated milk products to delay gelation of the concentrated milk products by minimizing the rate at which the viscosity of the concentrates increases during cold storage. By another approach, the methods described herein are effective to substantially reduce the viscosity of the concentrated milk products. The methods described herein advantageously increase the length of time the high solids milk concentrates remain fluid and pumpable during refrigerated shelf-life. The high solids concentrated milk products treated with the methods provided herein include about 33 to about 43 percent total solids. By one approach, the high solids concentrated milk products have a pH of about 4.6 to about 6.7, and include salt at about 0.25 to about 6 percent by weight of the concentrate.

28 Claims, 19 Drawing Sheets

(56) References Cited

U.S. PATENT DOCUMENTS

| | | |
|---|---|---|
| 4,965,078 A | 10/1990 | Freeman |
| 5,006,348 A | 4/1991 | Monckton |
| 5,037,659 A | 8/1991 | Trecker |
| 5,094,873 A | 3/1992 | Kerrigan |
| 5,165,945 A | 11/1992 | Kornacki |
| 5,175,015 A | 12/1992 | Kahn |
| 5,213,827 A | 5/1993 | Kostak |
| 5,277,926 A | 1/1994 | Batz |
| 5,334,398 A | 8/1994 | Sagara |
| 5,356,639 A | 10/1994 | Jameson |
| 5,356,640 A | 10/1994 | Jameson |
| 5,374,443 A | 12/1994 | Jackson |
| 5,378,479 A | 1/1995 | Trecker |
| 5,429,829 A | 7/1995 | Ernster, Sr. |
| 5,431,931 A | 7/1995 | Nauth |
| 5,445,845 A | 8/1995 | Farkye |
| 5,503,864 A * | 4/1996 | Uchida ............... A23C 9/1425 426/583 |
| 5,503,865 A | 4/1996 | Behringer |
| 5,532,018 A | 7/1996 | Miller |
| 5,547,691 A | 8/1996 | Kjaer |
| 5,554,397 A | 9/1996 | Sueyasu |
| 5,585,132 A | 12/1996 | Mehnert |
| 5,635,228 A | 6/1997 | Sponholtz |
| 5,709,900 A | 1/1998 | Miller |
| 6,051,271 A | 4/2000 | Kusaka |
| 6,139,901 A | 10/2000 | Blazey |
| 6,177,118 B1 | 1/2001 | Blazey |
| 6,183,804 B1 | 2/2001 | Moran |
| 6,183,805 B1 | 2/2001 | Moran |
| 6,475,538 B2 | 11/2002 | Thakar |
| 6,485,762 B1 | 11/2002 | Rizvi |
| 6,773,740 B2 | 8/2004 | Hyde |
| 6,916,496 B2 | 7/2005 | Koka |
| 7,026,004 B2 | 4/2006 | Loh |
| 7,169,428 B2 | 1/2007 | Dunker |
| 7,695,745 B2 | 4/2010 | Johnston |
| 7,854,952 B2 | 12/2010 | Carr |
| 8,080,276 B2 | 12/2011 | Dybing |
| 8,449,938 B2 | 5/2013 | Tossavainen |
| 8,628,810 B2 | 1/2014 | Barbano |
| 2002/0071897 A1 | 6/2002 | Carruthers |
| 2003/0054068 A1 | 3/2003 | Bhaskar |
| 2003/0194468 A1 | 10/2003 | Baker |
| 2004/0151802 A1 | 8/2004 | Bradbury |
| 2005/0112239 A1 | 5/2005 | Kotecha |
| 2005/0214409 A1* | 9/2005 | Tossavainen ........ A23C 9/1422 426/34 |
| 2005/0214431 A1 | 9/2005 | Carr |
| 2006/0240149 A1 | 10/2006 | Baker |
| 2007/0082086 A1* | 4/2007 | Carr ....................... A23C 19/08 426/34 |
| 2007/0166447 A1 | 7/2007 | Ur-Rehman |
| 2007/0172548 A1* | 7/2007 | Cale ....................... A23C 1/16 426/36 |
| 2008/0008813 A1* | 1/2008 | Maron et al. ............... 426/587 |
| 2008/0145498 A1 | 6/2008 | Howard |
| 2008/0160134 A1* | 7/2008 | Hestekin .................. A23C 3/00 426/43 |
| 2009/0317514 A1* | 12/2009 | Sizer ............................... 426/42 |
| 2010/0062110 A1 | 3/2010 | Elston |
| 2010/0098820 A1 | 4/2010 | Imai |
| 2010/0239713 A1 | 10/2010 | Merrill |
| 2013/0040029 A1 | 2/2013 | Hoffmann |
| 2013/0302491 A1 | 11/2013 | Doring |
| 2013/0302492 A1 | 11/2013 | Doring |
| 2014/0017357 A1 | 1/2014 | Aaltonen |
| 2014/0287118 A1 | 9/2014 | Adachi |

FOREIGN PATENT DOCUMENTS

| | | |
|---|---|---|
| WO | 1991000690 | 1/1991 |
| WO | 1992006598 | 4/1992 |
| WO | 1993020704 | 10/1993 |
| WO | 1996008155 | 3/1996 |
| WO | 1999037162 | 7/1999 |
| WO | 2004057971 | 7/2004 |
| WO | 2012110706 | 8/2012 |

OTHER PUBLICATIONS

"Repasteurizing 101" http://greenbabyguide.com/2009/03/04/saving-organic-milk-from-going-bad-re-pasteurizing-101/ (Apr. 2009) pp. 1-5.*

James, "Milk Pasteurization" Immunisation:The Reality Behind the Myth (1995) original pp. 91-94, pp. 1-4.*

El-Salam et al., "Effect of pH and sodium chloride on the viscosity of skim milk retentates", Le Lait, 1987, 67 1987) (1), 111-119. (Year: 1987).*

Dewan, R.K., et al. "Viscosity and Voluminosity of Bovine Milk Casein Micelles." Journal of Dairy Science 56.6, Jun. 699-705. 1973: 699-705.

Walstra, Pieter, et al. Dairy Chemistry and Physics; Table of Contents and Chapter 13: Casein Micelles; pp. 229-253. New York: Wiley, 1984.

* cited by examiner

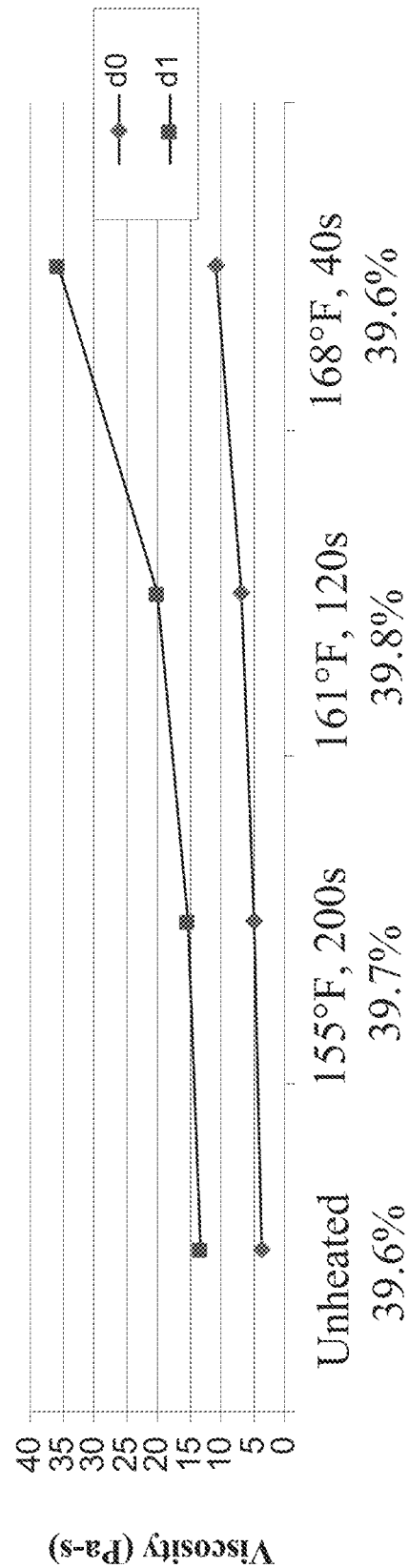

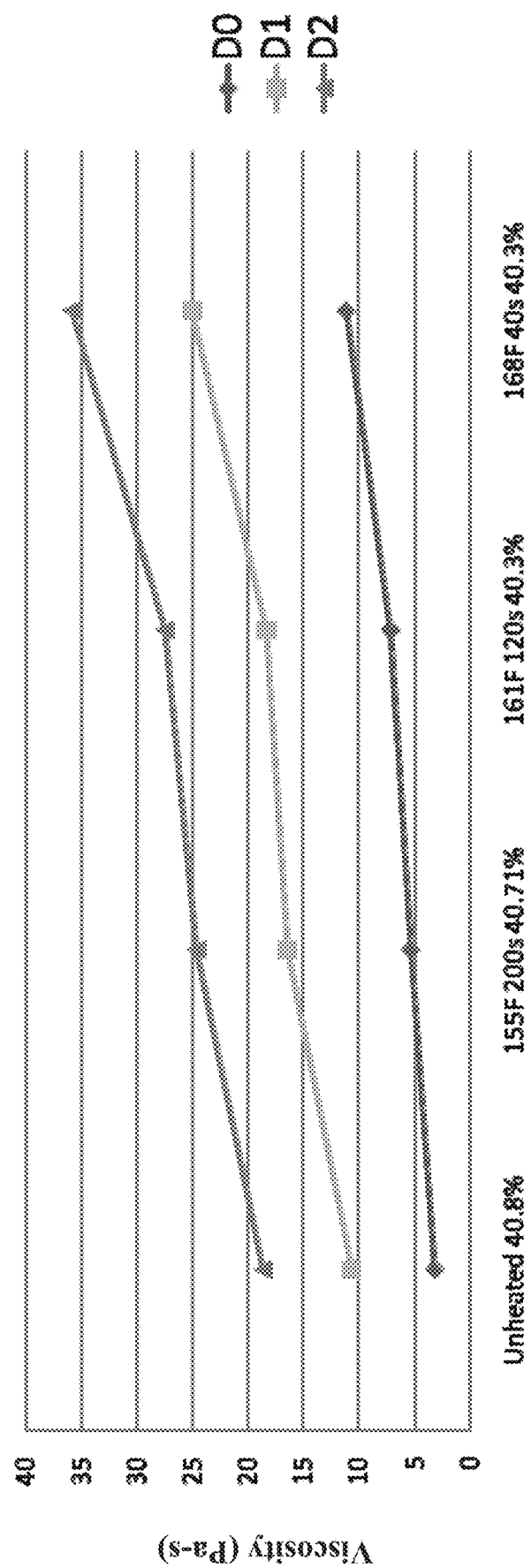

Tempering Experiment with Unheated Retentate, 39.6% solids, 45°F, shear rate of 10 sec$^{-1}$ Tempering Experiment with Heated Retentate, 39.6% solids, 45°F, shear rate of 10 sec$^{-1}$ FIG. 15
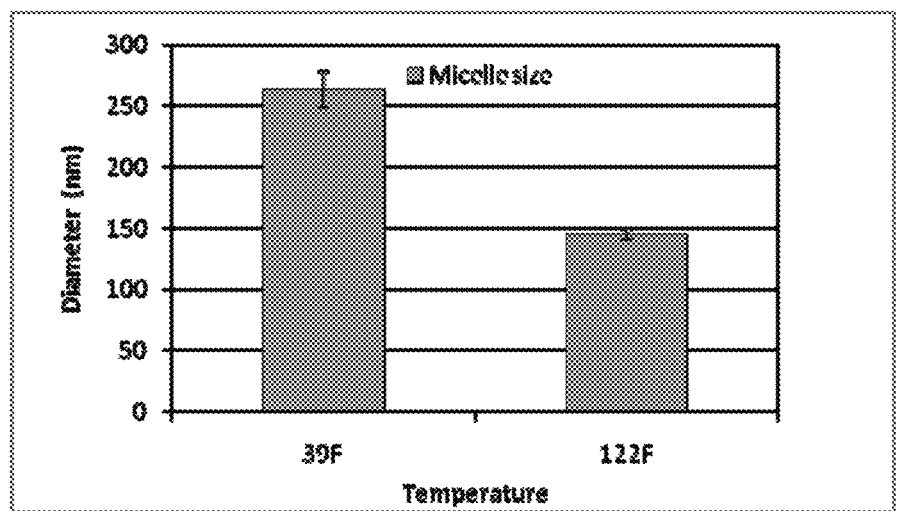
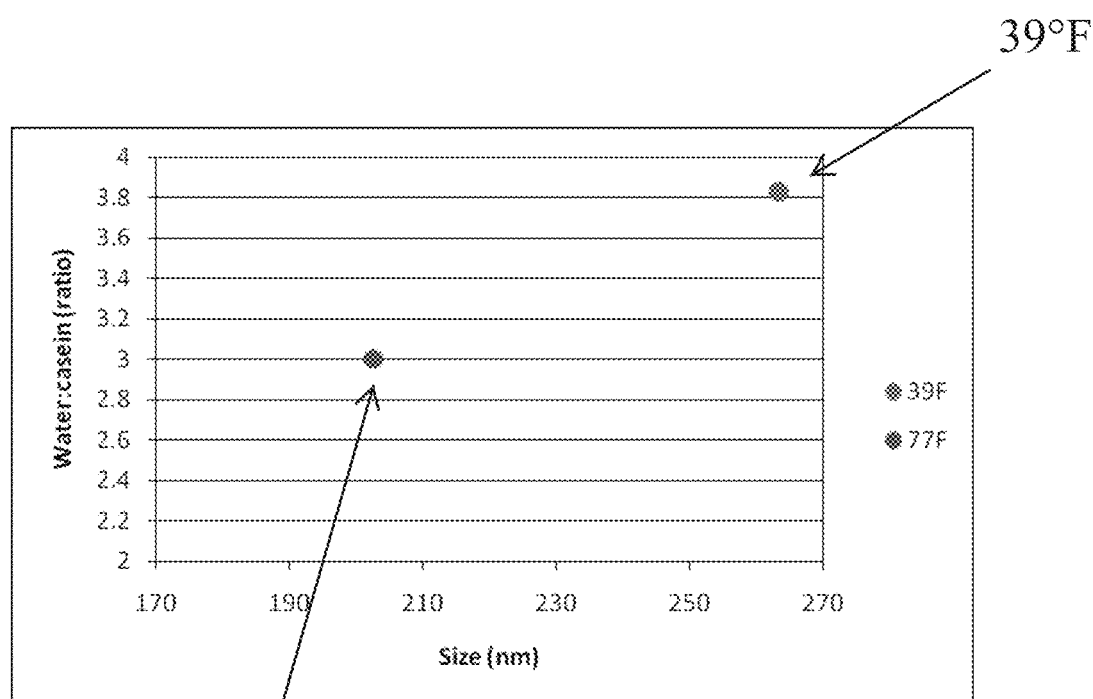
FIG. 16

24 h A+S

Supernatant

METHODS FOR REDUCING VISCOSITY AND DELAYING ONSET OF COLD GELATION OF HIGH SOLIDS CONCENTRATED MILK PRODUCTS

CROSS REFERENCE TO RELATED APPLICATION

This application claims the benefit of U.S. Provisional Application No. 61/510,359, filed Jul. 21, 2011, which is incorporated herein by reference in its entirety.

FIELD

The disclosure relates to high solids concentrated milk products and methods for treating the same.

BACKGROUND

Concentrated milk products are often desired because they allow for smaller quantities of milk to be stored and transported, thereby resulting in decreased storage and shipping costs. Concentrated milk products are generally prepared from whole milk, partly skimmed milk, skim milk, and combinations thereof.

Membrane filtration technology (e.g., microfiltration, ultrafiltration, and the like) is employed in the dairy industry to provide selective separation, concentration, and purification of protein components from a liquid dairy product such as raw milk. Membrane filtration technology involves separating the liquid dairy product into a first liquid component (i.e., permeate or ultrafiltrate) and a second liquid component (i.e., concentrate or retentate) by placing the dairy product in contact with a semi-permeable membrane. The liquid dairy product is usually contacted with the semi-permeable membrane under pressure and is typically subjected to turbulent flow so as to agitate the liquid adjacent the membrane and thereby allowing water and small molecular weight solutes (e.g., lactose) to pass through the membrane in order to obtain higher solids in the retained liquid concentrate. The concentrate, which does not flow through the semi-permeable membrane, has a higher protein concentration than the permeate. In conventional ultrafiltration processes, the permeate is collected and typically disposed of on the farm, used as livestock feed, disposed to the city wastewater, or converted to other forms. The retentate is typically treated until a milk concentrate with the desired enriched concentration factor and/or solids content is obtained.

On-farm ultrafiltration generally allows reduced volumes for the resulting concentrated milk products, thereby lowering shipping, storage, and refrigeration costs. Thus, milk intended for shipment is often concentrated by a factor of about 3 times (based on total solids) to obtain these benefits. Modern membrane filtration technology, however, allows efficient production of more than about 5 times (based on concentration of total solids) milk concentrates, which would, of course, allow for additional cost savings since less water would be shipped. However, 3.5 times and higher concentrates (especially 5 times and higher) are likely to gel during transportation or storage. Such age gelation characteristics generally limit the use of such higher concentrated products unless special and costly handling systems are available. For example, the concentrates can be heated at low temperatures prior to pumping but at the risk of increasing the microbial content of the concentrate so these products are typically used in cheese-making processes right after pumping.

Therefore, currently available concentrated milk products that are transported over long distances are generally limited to those having a total solids content below about 30 percent and a shelf life of about 5 days.

SUMMARY

The disclosure provides high solids concentrated milk products and methods for treating the same. The viscosity of high solids milk concentrates increases during cold storage (i.e., at refrigeration temperatures at about 33 to about 55° F., in another aspect about 33 to about 40° F., and in another aspect about 33 to about 45° F.). Heating at higher temperatures, such as high temperature short time (HTST) heating steps, of concentrates to reduce the microbial load often increases both the viscosity of the concentrate and the rate of viscosity increase, thereby quickening the onset of cold gelation. In one aspect, methods are provided which are effective to reduce the microbial load of the concentrate while delaying gelation by minimizing the rate at which the viscosity increases during cold storage. In another aspect, methods are provided to substantially reduce the viscosity of the high solids concentrated milk products, even after the onset of cold gelation. The high solids concentrates and methods provided herein advantageously provide effective mechanisms for managing cold gelation that can occur during shipping, handling, and storage of concentrated milk products.

By one approach, the high solids concentrated milk products described herein have a total solids concentration of about 33 to about 43 percent, in another aspect about 37 to about 40 percent solids. "Total solids" refers to the total of the fat and solids-non-fat (SNF) content, including protein, lactose, minerals, acid, enzymes, vitamins, and any other solids present in the milk.

By another approach, the high solids concentrated milk products have a pH of about 4.6 to about 6.7, in another aspect about 5.0 to about 6.7, in another aspect about 5.3 to about 6.5, in another aspect about 5.6 to about 6.2, and in yet another aspect about 5.7 to about 6.1, and include added salt at about 0.25 to about 6 percent, in another aspect about 0.5 to about 5.7 percent, in another aspect about 0.5 to about 4.6 percent, and in yet another aspect about 0.5 to about 2.5 percent salt by weight of the concentrate. Such high solids concentrated milk products can be prepared by treating with salt and acidification before and/or after concentrating a dairy liquid to increase the solids content. Advantageously, such high solids milk concentrates have reduced viscosity after heating compared to milk concentrates prepared without the same pH adjustment and salt addition.

In another aspect, methods are provided for delaying gelation during cold storage by minimizing the rate at which the viscosity of the high solids concentrate increases, thereby increasing the amount of time the concentrate remains fluid and pumpable. By this approach, the temperature and time of heat treatment can be selected to reduce the microbial content by a desired amount while also slowing the rate of viscosity increase. The method includes heating a high solids concentrate at a percent solids-dependent temperature that is lower than normally used to treat concentrated milk, such as about 140 to about 170° F., in another aspect about 145° F. to about 161° F., and in yet another aspect about 146 to about 155° F., for about 30 to about 300 seconds, which is effective to reduce the microbial content by at least about 2 logs while also slowing the rate of viscosity increase compared to heat treatments at higher temperatures and shorter lengths of time.

The temperature selected for the heat treatment may depend in part on the solids content of the concentrate. For example, the higher end of the temperature range may be more suitable for concentrates having a total solids content on the lower end of the range of about 33 to about 43 percent total solids, and the lower end of the temperature range may be more suitable for concentrates having a total solids on the upper end of the range of about 33 to about 43 percent total solids. The high solids concentrates treated according to this method do not require pre-treatment to alter the ionic strength or pH of the concentrate, although pre-treated concentrates as described further herein can provide further reduced rates of viscosity increase during cold storage.

By another approach, a method is provided where gelation can be reversed and the viscosity substantially reset and decreased by treating or tempering the high solids milk concentrate to a heat treatment of about 68° F. to about 130° F. for about 1 second to about 30 minutes, in another aspect about 1 second up to about 15 minutes, in another aspect about 1 second up to about 10 minutes, and in another aspect for about 1 second to about 5 minutes, followed by cooling to refrigeration temperatures. By one approach, a heat treatment of about 110 to about 130° F. for about 15 seconds to about 60 seconds and then cooling can be used. The heat treatment or tempering can be repeated as needed to provide the needed viscosity decrease. The high solids concentrates treated according to this method do not require pre-treatment to alter the ionic strength or pH of the concentrate, although pre-treated concentrates as described further herein can be heated to provide lower viscosities than non-treated concentrates.

BRIEF DESCRIPTION OF THE DRAWINGS

FIG. 8 is a graph showing the viscosities after heating concentrates prepared from whole milk pretreated with salt and acid at different temperatures and for different lengths of time.

FIG. 9 is a graph showing the viscosities after heating treated concentrates prepared from 3× milk pretreated with salt and acid at different temperatures and for different lengths of time.

FIG. 15 is a graph showing micelle size changes as a function of temperature.

FIG. 16 is a graph showing the relationship between casein micelle size and water:casein ratio at 39° F. and 77° F.

(FIG. 18A) and 39° F.

(FIG. 19A) and 39° F.

(FIG. 20A) and 39° F.

DETAILED DESCRIPTION

Figure 1:
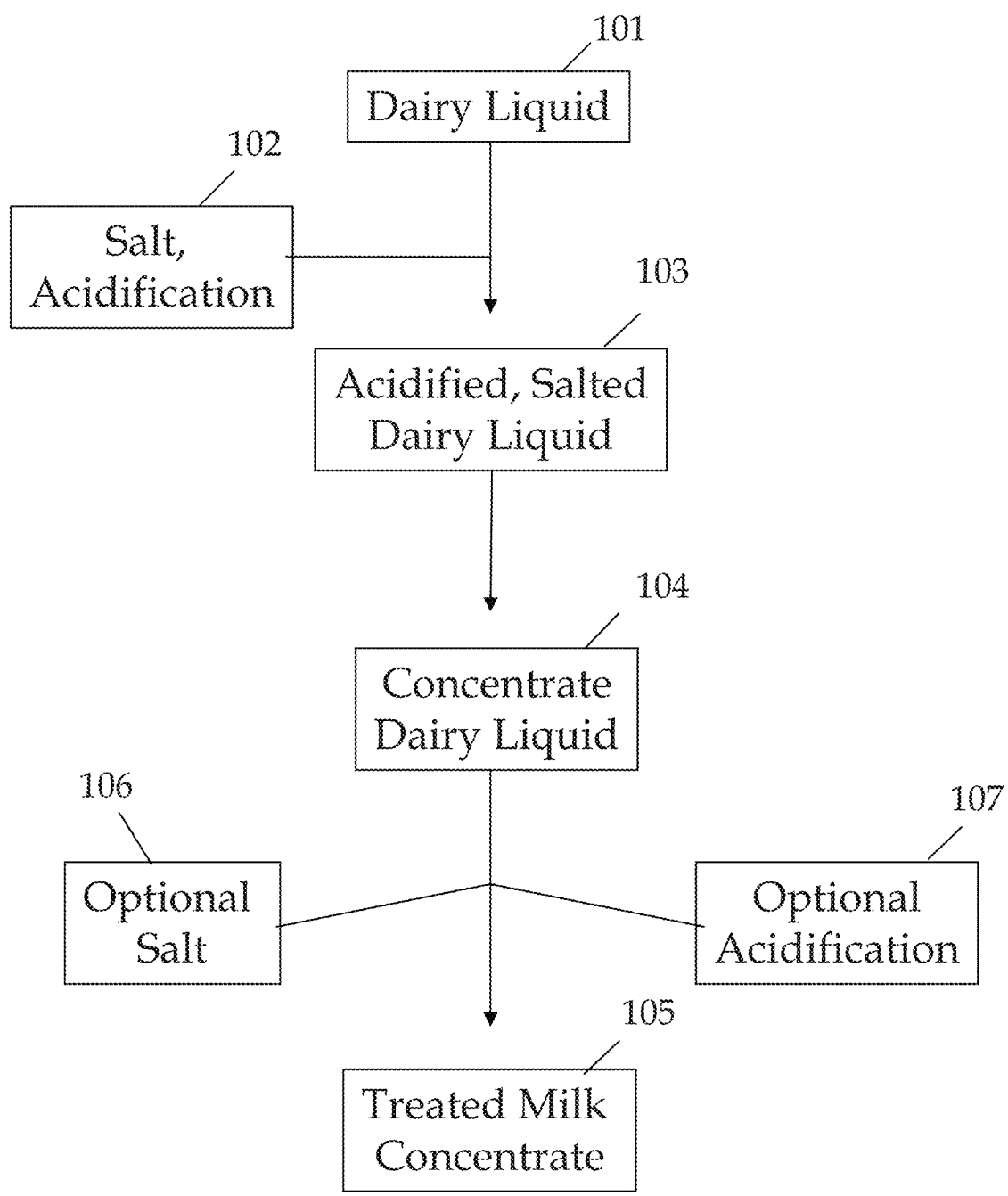
FIG. 1 is a flowchart illustrating an exemplary method for preparing a treated milk concentrate.

The disclosure relates to methods for preparing high solids concentrated milk products, as well as methods for substantially reducing the viscosity of the high solids concentrated milk products. In another aspect, methods are provided for delaying gelation during cold storage by minimizing the rate at which the viscosity of the high solids concentrate increases, thereby increasing the amount of time the concentrate remains fluid and pumpable. By "high solids" is meant that the concentrated milk products include about 33 to about 43 percent total solids, in another aspect about 34 to about 40 percent total solids, and in another aspect about 35 to about 38 percent total solids. "Total solids" refers to the total of the fat and solids-non-fat (SNF) content, including protein, lactose, minerals, acid, enzymes, vitamins, and any other solids present in the milk. By "cold storage" is meant refrigeration temperatures, such as about 33 to about 55° F., in another aspect about 33 to about 50° F., and in another aspect about 33 to about 45° F.

Methods of concentrating dairy liquids often are conducted at elevated temperatures, which can increase the microbial content of the dairy liquid. For example, ultrafiltration is often carried out at about 65 to about 150° F. Therefore, it may be desirable to heat treat the concentrate at a time and temperature effective to reduce the microbial content to a level that would allow storage of the product under appropriate refrigerated conditions until further use. By one approach, the heat treatment is at a temperature and for a time effective to provide at least a 2 log reduction of vegetative pathogenic and spoilage organisms, such as by reference to an indicator strain like *Listeria monocytogenes*, and in another aspect at least a 3 log reduction, before storage or further use of the concentrate. Food spoilage, as that term is used herein, includes any alteration in the condition of food which makes it less palatable including changes in taste, smell, texture or appearance. The milk concentrate itself may not contain a sufficient number of organisms to achieve a 2 log reduction of vegetative pathogenic and spoilage organisms, but the heat treatment would be effective to impart an at least 2 log reduction in a comparative milk concentrate that is identical except for having been inoculated with *Listeria monocytogenes* or other indicator strain at a level suitable for observing an at least 2 log reduction. For example, *Listeria monocytogenes* strain V-37, as is commonly used in the art, may be used as an indicator strain. The at least 2 log reduction of vegetative pathogenic and spoilage organisms can be measured by any suitable method, including, for example, conventional techniques utilizing media suitable and selective for an indicator strain. It has been found though that heating the concentrate often increases the rate of viscosity increase and quickens the onset of cold gelation. For example, heating a concentrate of about 40 percent total solids at 168° F. for 40 seconds may cause excessive viscosity increase such that the high solids concentrate may be too viscous, even immediately after cooling to be useful in applications requiring a flowable or pumpable concentrate. The viscosity of the concentrate generally continues to increase further during cold storage. For example, a viscosity above about 20 Pa·s at 45° F. can adversely affect pumping of the concentrate and use in a variety of cheese-making equipment. The excessively high viscosity of the high solids concentrates after heating has limited their usefulness in food industry applications which require the concentrates to be transported and pumpable.

Unless stated otherwise, viscosity values described herein are measured at 45° F. at a shear rate of 10 sec$^{-1}$ using a Haake VT550 Rheometer from Thermo Scientific using a SV1 or SV2 spindle and cup geometry.

It was surprisingly found that selection of temperatures and times for heat treatment of high solids concentrated milk can be effective to reduce the microbial content by a desired amount while also minimizing the rate of viscosity increase so that the high solids concentrated milk remains pumpable and fluid for a longer period of time. By one approach, it has been found that heating a high solids concentrate at a percent solids-dependent, lower temperature as explained below, such as about 140° F. to about 168° F., in another aspect about 145° F. to about 161° F., and in yet another aspect about 146° F. to about 155° F., for about 30 to about 300 seconds is effective to reduce the microbial content by at least about 2 logs while also slowing the rate of viscosity increase compared to heat treatments at higher temperatures and shorter lengths of time. The temperature selected for the heat treatment may depend in part on the solids content of the concentrate. For example, the higher end of the temperature range may be more suitable for concentrates having a total solids content on the lower end of the range of about 33 to about 43 percent total solids, and the lower end of the temperature range may be more suitable for concentrates having a total solids on the upper end of the range of about 33 to about 43 percent total solids.

At least by some approaches, the heating and cooling steps are effective to provide an initial viscosity of the concentrate of less than 20 Pa·s, and the viscosity of the concentrated dairy liquid stays below 20 Pa·s for at least 24 hours at refrigeration temperatures of 45° F. or lower. In one aspect, the heating step is effective to provide a viscosity rate increase after cooling of about 0.54 Pa·s/hour or lower. In another aspect, the heating step is effective to provide a viscosity rate increase after cooling of about 0.47 Pa·s/hour or lower. The high solids concentrates treated according to this method do not require pre-treatment to alter the ionic strength or pH of the concentrate, although treated concentrates as described further herein can provide further reduced rate of viscosity increase during cold storage.

When a high solids milk concentrate is stored at refrigeration temperatures, the viscosity generally increases over time and eventually results in gelation of the concentrate. Gelation often occurs even when the high solids concentrate has not been heated after the concentration step. It was surprisingly found that gelation could be reversed and the viscosity substantially decreased by treating the high solids milk concentrate to a heat treatment of about 68° F. to about 130° F. for 1 second to about 30 minutes, in another aspect about 1 second up to about 15 minutes, in another aspect about 1 second up to about 10 minutes, and in another aspect for about 1 second to about 5 minutes, in another aspect about 110 to about 130° F. for about 15 seconds to about 60 seconds. It was further surprisingly found that this heat treatment could be repeated as needed to provide decreased viscosity. Again, the high solids concentrates treated according to this method do not require pre-treatment to alter the ionic strength or pH of the concentrate, although treated concentrates as described further herein can be heated to provide lower viscosities than non-treated concentrates.

By another approach, high solids concentrated milk products have a pH of about 4.6 to about 6.7, in another aspect about 5.0 to about 6.7, in another aspect about 5.3 to about 6.5, in another aspect about 5.6 to about 6.2, and in yet another aspect about 5.7 to about 6.1, and include added salt at a level of about 0.25 to about 6 percent, in another aspect about 0.5 to about 5.7 percent, in another aspect about 0.5 to about 4.6 percent, and in yet another aspect about 0.5 to about 2.5 percent salt by weight of the concentrate. The percentages of salt used herein refer to the percent salt added to the dairy liquid or concentrate and do not refer to salt that may inherently be present in the milk concentrate and/or dairy liquid. Such high solids concentrated milk products can be prepared by treating with salt and acidification before and/or after concentrating a dairy liquid to increase the solids content. Advantageously, such high solids milk concentrates have reduced viscosity after heating compared to milk concentrates prepared without the same pH and salt addition.

The methods described herein advantageously can decrease the viscosity or delay the onset of viscosity-related defects of the high solids concentrated milk products and thereby increase the useful refrigerated shelf-life of the products. By one approach, the methods described herein are effective to delay gelation of the concentrated milk products by decreasing the rate of viscosity increase during cold storage. By another approach, the methods described herein are effective to at least substantially reverse gelation of the concentrated milk products. In some embodiments, it was very surprisingly and unexpectedly found that the methods described herein can be effective to impart a viscosity drop or to reduce the viscosity of the concentrated milk products to a level less than the viscosity of the product right after being concentrated, which was previously thought to be the lowest viscosity point during the refrigerated shelf life of the concentrate.

In certain aspects, the methods described herein include the preparation of a treated milk concentrate that can be thermally processed to minimize the rate of viscosity increase during cold storage. The treated milk concentrate can be prepared by a variety of approaches. As described in more detail below, the starting dairy liquid can be treated with salt and acidified prior to being concentrated to the desired solids content, with optional further salt and acidification steps after concentration. In another aspect, the retentate obtained from the concentration step can be treated with salt and acidified.

The cooled milk concentrates described herein exhibit non-Newtonian behavior in which viscosity is dependent on shear rate. By one approach, viscosity can be measured at 45° F. at a shear rate of 10 to about 500 sec$^{-1}$, such as by using a Haake VT550 Rheometer from Thermo Scientific using a SV1 or SV2 spindle and cup geometry. It was found that a concentrate's viscosity at a shear rate of 10 sec$^{-1}$ is indicative of whether the fluid will flow out of a tank by gravity. Generally, a viscosity of less than about 20 Pa·s at a shear rate of 10 sec$^{-1}$ will flow out of a tank by gravity and preferably the viscosity is less than about 15 Pa·s. The salt and acid treated high solids milk concentrates described herein advantageously have acceptable viscosity and fluidity for gravity flow for longer periods of time. Further, the methods described herein advantageously are able to minimize the rate at which viscosity increases as well as to substantially reduce the viscosity of the high solids concentrates before or after the onset of cold gelation.

FIG. 1 illustrates a method for preparing a treated milk concentrate suitable for thermal processing to reduce the viscosity of the concentrate. Dairy liquid 101 is combined in step 102 with about 0.25 to about 5 percent salt by weight of the dairy liquid, in another aspect about 0.5 to about 5 percent salt, in another aspect about 0.5 to about 4.6 percent salt, and in yet another aspect about 0.5 to about 2.5 percent salt, and acidified to provide an acidified, salted dairy liquid 103 having a pH of about 4.6 to about 6.7, in another aspect about 5.0 to about 6.7, in another aspect about 5.3 to about 6.5, in another aspect about 5.6 to about 6.2, and in another aspect about 5.7 to about 6.1. The treated liquid can be incubated for any desired length of time prior to the concentration step. The length of holding time prior to concentration is not believed to have a significant impact on the effectiveness of the method. For example, the treated dairy liquid can be held for 0 minutes to about 48 hours, and in another aspect about 10 minutes to about 15 hours, if desired, prior to concentrating the dairy liquid. By one approach, the process is continuous and there is no hold time before the concentration step.

The acidified and salted dairy liquid is then concentrated in step 104 to provide a treated concentrate 105 having about 33 to about 43 percent total solids, in another aspect about 34 to about 40 percent total solids, and in another aspect about 35 to about 38 percent total solids. After concentration, additional salt optionally may be added in step 106, such as in an amount effective to provide a concentrate having a total added salt level of about 0.25 to about 6 percent salt, in another aspect about 0.5 to about 5.7 percent salt, in another aspect about 0.5 to about 4.6 percent salt, and in yet another aspect about 0.5 to about 2.5 percent salt by weight of the concentrate. The treated concentrate may also be further acidified in step 107, if desired, such as to about pH 4.6 to about 6.7. If used, the salt and acidification steps can be performed separately or at the same time.

Figure 2:
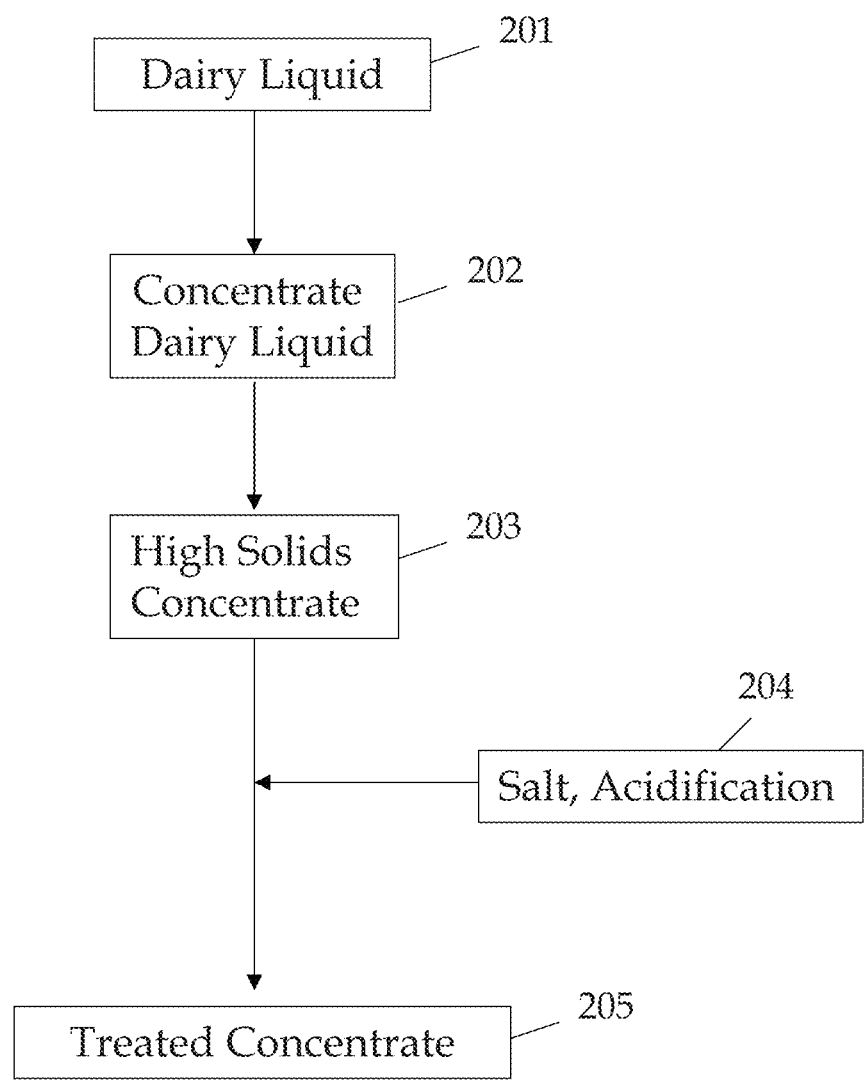
FIG. 2 is a flowchart illustrating another exemplary method for preparing a treated milk concentrate.

FIG. 2 illustrates another method for preparing a treated milk concentrate suitable for thermal processing to reduce the viscosity of the concentrate. By this approach, the dairy liquid 201 is treated with salt and acidification after the concentration step instead of prior to the concentration step. Dairy liquid 201 is concentrated in step 202 to provide a high solids concentrate 203 having about 33 percent to about 43 percent total solids, in another aspect about 34 to about 40 percent total solids, and in another aspect about 35 to about 38 percent total solids. The high solids concentrated milk product is then combined with about 0.25 to about 6 percent salt, in another aspect about 0.5 to about 5.7 percent salt, in another aspect about 0.5 to about 4.6 percent salt, and in yet another aspect about 0.5 to about 2.5 percent by weight salt of the concentrate and acidified in step 204 to provide treated concentrate 205 having a pH of about 4.6 to about 6.7, in another aspect a pH of about 5.0 to about 6.7, in another aspect about 5.3 to about 6.5, in another aspect about 5.6 to about 6.2, and yet in another aspect about 5.7 to about 6.1.

A variety of dairy liquids can be used as a starting material in the methods described herein. Preferably, the dairy liquid originates from any lactating livestock animal whose milk is useful as a source of human food. Such livestock animals include, by way of non-limiting example, cows, buffalos, other ruminates, goats, sheep, and the like. Generally, however, cow's milk is preferred as the starting material. The milk used may be raw milk, whole milk, reduced-fat milk, low fat milk, skim milk, and combinations thereof. "Raw milk" generally means milk that has not yet been thermally processed. "Whole milk" generally means not less than about 3.25 percent fat milk. "Reduced fat" milk means about 2 percent fat milk. "Low fat" milk means about 1 percent fat milk. "Skim milk" means less than 0.2 percent fat milk. The milk or milk products used in the methods described herein can be standardized or non-standardized. Concentrated forms of the milk can also be used, if desired. For example, a concentrated milk product having a total solids content up to about 30 percent may be useful as a dairy liquid starting material. The dairy liquid may also include, for example, reconstituted powdered whole milk, reduced fat milk, skim milk, or the like. By some approaches, the dairy liquid is pasteurized prior to use in the methods described herein.

Cow's milk contains lactose, fat, protein, minerals, and water, as well as smaller amounts of acids, enzymes, gases, and vitamins. Although many factors may affect the composition of untreated cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Milk contains many types of proteins, but the proteins generally can be grouped into casein proteins and serum proteins. The minerals, also known as milk salts or ash, generally include, as the major components, calcium, sodium, potassium, and magnesium. These cations can combine with phosphates, chlorides, and citrates in milk. Milk fat is mostly comprised of triglycerides and smaller amounts of various other lipids. Lactose or milk sugar (4-O-β-D-galactopyranosyl-D-glucose) is a reducible disaccharide present in raw milk.

In accordance with the methods described herein, the dairy liquid starting material can be concentrated by a variety of concentration techniques effective to provide a milk concentrate having the desired high solids content. Suitable methods include, for example, ultrafiltration, diafiltration, microfiltration, and combinations thereof. Preferably, ultrafiltration is used and the permeate is removed to obtain a UF retentate. The UF retentate has a target protein concentration of about 12 to about 17 percent, a fat concentration of about 14.6 to about 20.1 percent, and a lactose concentration of about 3.5 to about 4.5 percent.

Methods for ultrafiltering milk substrates are well known in the art of food processing. In various approaches, the ultrafiltration can be performed using conventional ultrafiltration equipment, such as, for example, with a filter having a cutoff of about 10 kDa. Filters with a smaller molecular weight cutoff can also be used, if desired. In one aspect, a spiral wound membrane filter is used, but other filters, such as ceramic filters, can also be used, if desired. The filter's cutoff is preferably selected so that substantially all macromolecular milk components are retained in the retentate. Ultrafiltration is typically carried out with a baseline pressure of about 5 to about 60 psi and a temperature of about 65° F. to about 150° F., in another aspect about 120° F. to about 135° F. The ultrafiltration may be carried out with any configuration of modules.

In another aspect, reverse osmosis, nanofiltration, and/or microfiltration can also be used. By one approach, microfiltration can be performed prior to ultrafiltration. By another approach, diafiltration is used. The concentration methods can be selected to provide the desired quantity of solids, calcium, and lactose in the retentate. Ultrafiltration in combination with diafiltration generally provides for lower lactose levels than ultrafiltration alone.

Methods for diafiltering and microfiltering dairy liquids are well known in the art of food processing. In some embodiments, diafiltration is performed using the same filter and under the same conditions as used for the ultrafiltration step, except that diluent is fed into the diafiltration system. By one approach, the diafiltration and ultrafiltration steps can be performed in the same system without disruption. Microfiltration can be performed using conventional microfiltration equipment with organic or inorganic membrane filters. Microfiltration is typically carried out under a uniform trans-membrane pressure of about 10 to about 60 psi and a temperature of about 45° F. to about 155° F. The microfiltration may be carried out with any configuration of modules. For example, modules using 1 to 36 membrane elements can be used as a filtration stage. By some approaches, the microfiltration process uses 1 to 5 filtration stages.

The salt added to the dairy liquid and/or high solids concentrate may be any food grade salt such as, for example, sodium chloride, potassium chloride, and combinations thereof. By one approach, sodium chloride is used. Whether added before, after, or before and after concentration of the dairy liquid, the amount of salt is generally selected to obtain a milk concentrate with a target added salt level of about 0.25 to about 6 percent, in another aspect about 0.5 to about 5.7 percent, in another aspect about 0.5 to about 4.6, and in yet another aspect about 0.5 to about 2.5 percent after concentration using ultrafiltration or other method to increase the ionic strength of the dairy liquid or resulting high solids concentrate. When added to the dairy liquid prior to concentration, generally about 0.25 to about 5 percent, in another aspect about 0.5 to about 5 percent, in another aspect about 0.5 to about 4.6 percent, and in another aspect about 0.5 to about 2.5 percent salt is added. When added to the retentate after concentration, generally about 0.25 to about 6 percent salt, in another aspect about 0.5 to about 5.7 percent salt, in another aspect about 0.5 to about 4.6, and in yet another aspect about 0.5 to about 2.5 percent salt is added. The addition of salt increases the ionic strength of the dairy liquid or concentrate. While not wanting to be limited by theory, it is believed that the ions from the salt interfere with the formation of protein bridges that would increase the viscosity of the high solids concentrate during cold storage. It is also believed that lowering the pH reduces the size of the casein micelles and reduces the binding sites for water molecules. Therefore, more water is retained in the aqueous phase and results in a more fluid product for a longer period of time.

The dairy liquid and/or concentrate can be acidified with a variety of food grade acidulants, including, but not limited to, lactic acid, hydrochloric acid, phosphoric acid, and combinations thereof. By one approach, lactic acid is used. The total amount of acid added is determined by the desired pH of the resulting acidified dairy liquid or concentrate. The dairy liquid or concentrate can also be acidified by culturing with a lactic acid culture, if desired, such as *Lactococcus lactis*, to provide the target pH. After the target pH is reached, the dairy liquid can be heated to inactivate the lactic acid culture and then, if necessary, concentrated, such as by ultrafiltration.

Advantageously, the treated milk concentrates described herein do not require the addition of emulsifiers, such as disodium phosphate, dipotassium phosphate, disodium citrate, trisodium citrate, and mixtures thereof, but emulsifiers can be used if desired. By one approach, emulsifiers can be included so long as the addition does not impact the viscosity of the concentrate or increase the rate of viscosity increase.

Figure 3:
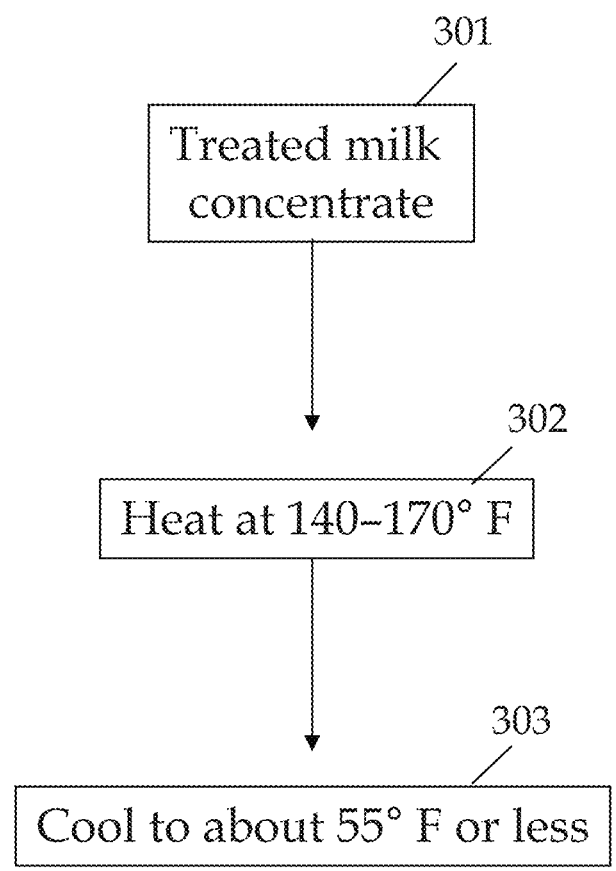
FIG. 3 is a flowchart illustrating an exemplary method for thermally treating the milk concentrates described herein.

The treated concentrates described herein can be further thermally processed to reduce the microbial content while also reducing the rate at which the viscosity of the concentrates increases during cold storage. FIG. 3 illustrates an exemplary method for thermally treating milk concentrates having about 33 to about 43 percent total solids as described herein. By one approach, the treated milk concentrate 301 is treated with heating step 302 at a percent solids dependent temperature range of about 140 to about 168° F., in another aspect about 145 to about 161° F., and in yet another aspect about 146 to about 155° F., for about 30 to about 300 seconds, with the higher end of the temperature range being more suitable for concentrates having a total solids content on the lower end of the range of about 33 to about 43 percent total solids, and the lower end of the temperature range being more suitable for concentrates having a total solids on the upper end of the range of about 33 to about 43 percent total solids. For example, a concentrate having a total solids content of about 33 to about 35 percent can be heated at a temperature of about 140 to about 170° F. for at least about 5 seconds, a concentrate having a total solids content of about 36 to about 38 percent can be heated at a temperature of about 140 to about 168° F. for at least about 15 seconds, a concentrate having a total solids content of about 39 to about 41 percent can be heated at a temperature of about 140 to about 165° F. for at least about 30 seconds, and a concentrate having a total solids content of about 42 to about 43 percent can be heated at a temperature of about 140 to about 161° F. for at least about 45 seconds.

In some approaches, the heating step is conducted for a time effective to achieve at least about a 2 log reduction, and, in another aspect, at least about a 3 log reduction, in microbes in the concentrate. Such heat treatment advantageously allows for increased useable life of the concentrate from a microbial stability perspective while also delaying gelation. After heating, the concentrate is cooled in step 303 to refrigeration temperatures. It was found that heat treatments at higher temperatures for shorter periods of time can result in cold gelation within a short time after heating and cooling.

At least by some approaches, the heating and cooling steps are effective to provide an initial viscosity of the concentrate of less than 20 Pa·s and the viscosity of the concentrated dairy liquid stays below 20 Pa·s for at least 24 hours at 45° F. or lower. In one aspect, the heating step is effective to provide a viscosity rate increase after cooling of about 0.54 Pa·s/hour or lower. In another aspect, the heating step is effective to provide a viscosity rate increase after cooling of about 0.47 Pa·s/hour or lower.

The viscosity of the milk concentrates described herein increases over time after concentration (e.g., ultrafiltration) and the heating step described in reference to FIG. 3.

Typically the viscosity immediately after concentration is the lowest it will be before increasing over time until the concentrate gels and is no longer flowable or pumpable. The length of time a concentrate remains fluid (i.e., without gelling) can be important for transporting the concentrate.

Figure 4:
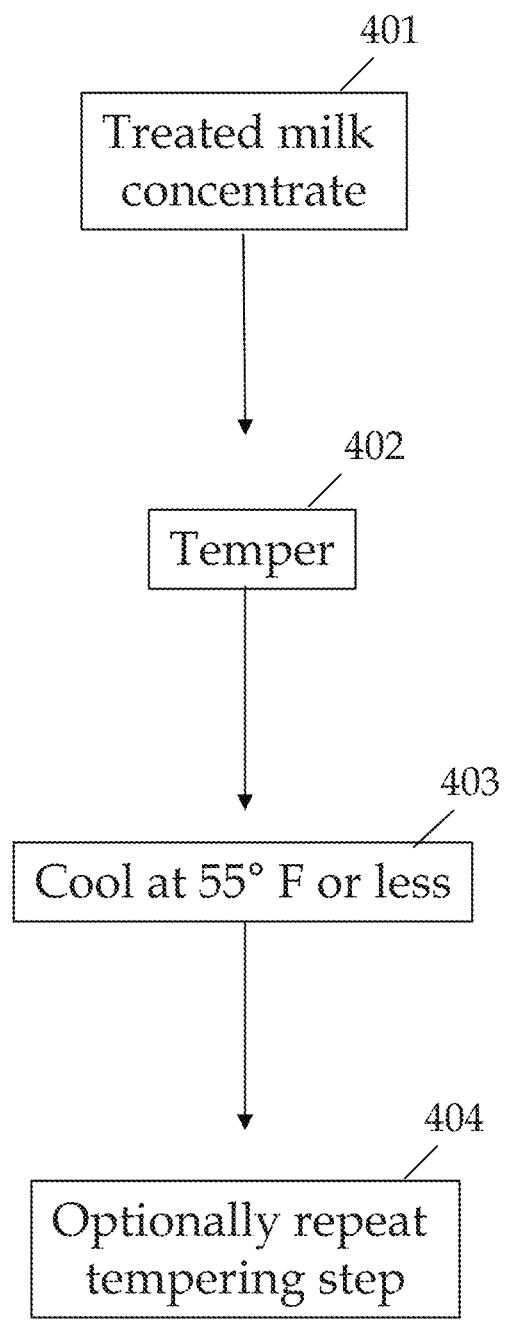
FIG. 4 is a flowchart illustrating an exemplary method for heating a treated milk concentrate to substantially reverse age gelation.

Generally, the treated milk concentrate will gel (i.e., have a viscosity of at least about 20 Pa·s at 45° F.) within about 1 to about 5 days of the concentration step or the heat treatment after being concentrated depending on the total solids level of the concentrate, as shown in FIG. 3. The viscosity of the concentrate after the concentration or the post-concentration heat treatment can be referred to as the "time zero viscosity" or "initial viscosity." It was surprisingly found that cold gelation could be substantially reversed using one or more tempering steps as illustrated in FIG. 4. The treated milk concentrate 401 can be tempered in step 402 at a temperature of about 68 to about 130° F. for about 1 second to about 30 minutes, in another aspect about 1 second up to about 15 minutes, in another aspect about 1 second up to about 10 minutes, in another aspect for about 1 second to about 5 minutes, in another aspect at about 110 to about 130° F. for about 15 to about 60 seconds, and then cooled in step 403 to refrigeration temperatures. Generally, tempering step 402 can be performed when the viscosity of the concentrate has increased to a level at which fluidity and/or pumpability is compromised. In one aspect, the concentrated dairy liquid is tempered when the concentrated dairy liquid has a viscosity of at least about 20 Pa·s at 45° F. By one approach, the tempering effective to provide a tempered viscosity after cooling that is less than about 20 Pa·s. In another aspect, the tempering step is effective to provide a tempered viscosity after cooling that is less than about 15 Pa·s. In yet another aspect, the tempering step is effective to provide a tempered viscosity after cooling that is less than about 10 Pa·s. By some approaches, tempering reduces the tempered viscosity of the concentrated liquid to within about 45 percent of the initial viscosity, in another aspect within about 30 percent of the initial viscosity, and in another aspect within about 15 percent of the initial viscosity. In some approaches, tempering reduces the tempered viscosity of the concentrated dairy liquid to less than the initial viscosity.

After tempering step 402 and cooling step 403, the viscosity again begins to build in the concentrate during cold storage. By some approaches, the tempering step 402 imparts a gelation decelerating effect to the concentrate by which the viscosity of the concentrate increases at a slower rate compared to the initial rate of increase after concentration. Optionally, one or more additional tempering steps 404 can be employed where the concentrated dairy liquid is tempered at a temperature of about 68° F. to about 130° F. and cooled to refrigeration temperatures when the concentrated dairy liquid has a viscosity of at least about 20 Pa·s. By some approaches, the one or more additional tempering steps are effective to provide a tempered viscosity after cooling that is less than about 20 Pa·s, in another aspect less than about 15 Pa·s, and in yet another aspect less than about 10 Pa·s. It was surprisingly found that tempering step 404 could be repeated after tempering step 402 to impart a gelation decelerating effect. Advantageously, in some aspects, tempering step 404 can be repeated as needed to reduce the viscosity and the rate of viscosity increase of the concentrate after onset of cold gelation. Therefore, by some approaches, tempering steps 402 and 404 can not only provide immediate improvement of the viscosity of the concentrate but can also reduce the rate at which the viscosity increases during cold storage.

In various approaches, the processes described herein can be carried out using a batch, semi-continuous, or continuous process with conventional equipment.

The concentrated milk products produced and treated according to the methods described herein can be used in a variety of food-making processes. For example, the concentrated milk can be evaporated and introduced into a cheese-making process.

The following examples illustrate various features of the methods and concentrates described herein but are not intended to limit the scope of the disclosure as set forth in the appended claims. Unless indicated otherwise, all percentages and ratios are by weight. Those skilled in the art will readily understand that variations of the materials, conditions, equipment, and processes described in these examples can be used. The Examples herein offer many theories and proposals for the mechanisms suggested above; Applicants do not wish to be limited by such theories.

EXAMPLES

Example 1

Pre-Treatment Effect on Cold Retentate Viscosity

Whole milk was pre-treated with a lactic brine solution to provide 0.18 percent lactic acid (88 percent solution), a pH of 5.9±0.2, and 1 percent salt based on the weight of the milk. The milk was then ultrafiltered to about 40 percent solids using two 4336 Koch membranes (10 kDa) in a batch unit with an inlet pressure of 40 psi, a pressure drop across each element of 25 psi, and an operating temperature of 125° F. The retentate was collected and evaluated against three comparative milk products that were ultrafiltered under the same conditions. The comparative ultrafiltered milk products included the following: (1) untreated milk (identified as "no-pretreat" in FIG. 5); (2) milk pre-treated with 1 percent salt only (not shown in FIG. 5); and (3) milk acidified with 0.18 percent lactic acid (88% solution) to a pH of 5.9 with no salt treatment (identified as "0.18% LA only" in FIG. 5). The samples not treated with lactic acid had a pH of 6.7.

Figure 5:
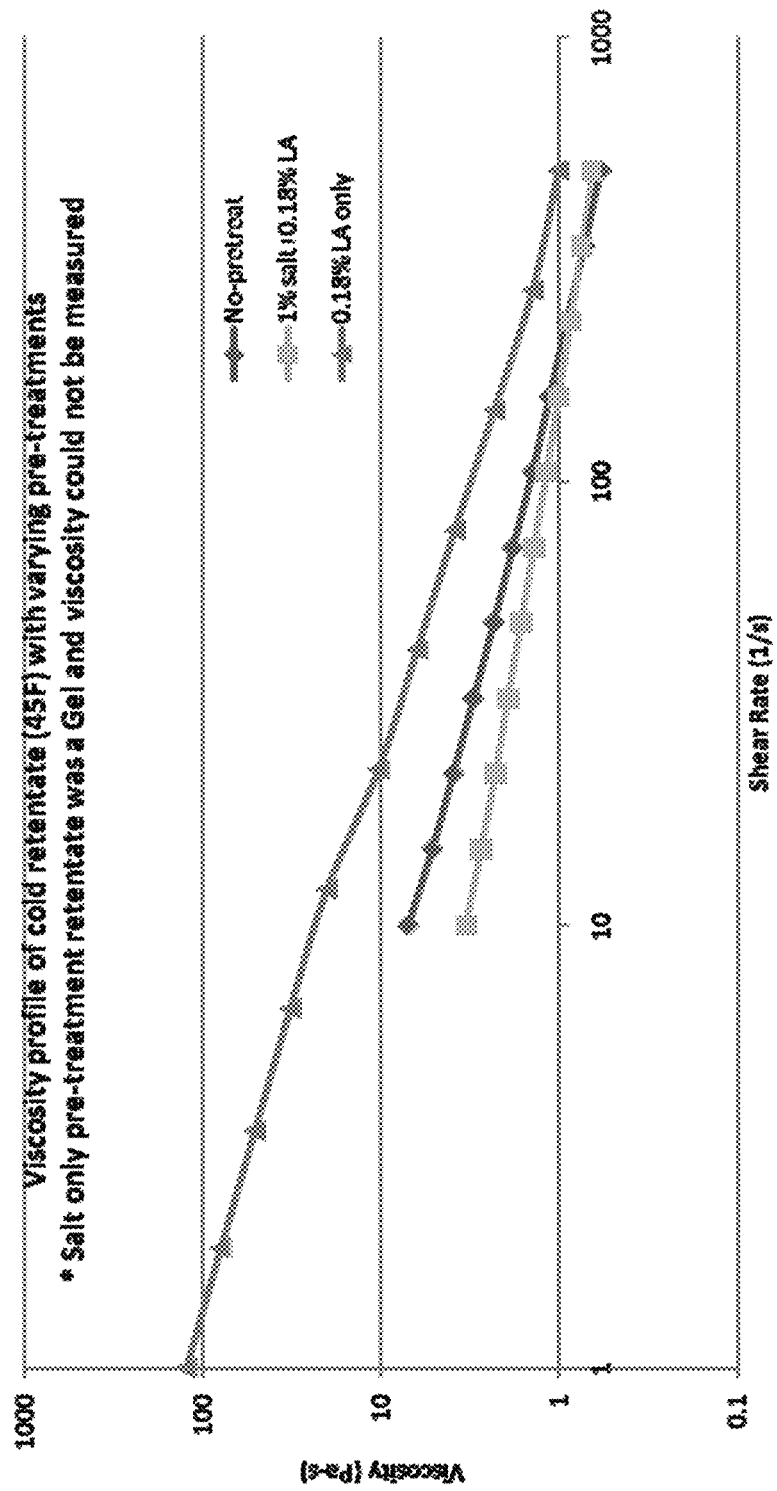
FIG. 5 is a graph showing the effects of salt and acid on the viscosities of retentates when the retentates are prepared from milk treated prior to ultrafiltration.

The viscosities of the samples were measured at 45° F. at a shear rate of 10 to 500 $sec^{-1}$ using a Haake VT550 Rheometer from Thermo Scientific. The viscosities were measured within two hours after ultrafiltration. As shown in the chart of FIG. 5, the sample pre-treated with both salt and lactic acid had the lowest viscosity. The viscosity of the milk pre-treated with salt only could not be measured because the concentrate formed a gel and is not shown in FIG. 5.

Example 2

Post UF Salting Effect on Cold Retentate Viscosity

Retentate was obtained from milk pre-treated with both 0.18 percent lactic acid (88% solution) and 1 percent salt and then ultrafiltered as described in Example 1. About 0.7 percent salt is believed to remain in the retentate after filtration. The retentate was then heated for 30 seconds minutes at 165° F. and then combined with 0 percent, 2 percent, or 4 percent salt by weight of the retentate. Therefore, the total amount of salt in each sample after the second salt addition step is calculated to be about 0.7 percent (0+0.7%), 2.7 percent (2%+0.7%), and 4.7 percent (4%+0.7%), respectively. Viscosities were measured as described in Example 1 within two hours of ultrafiltration.

Figure 6:
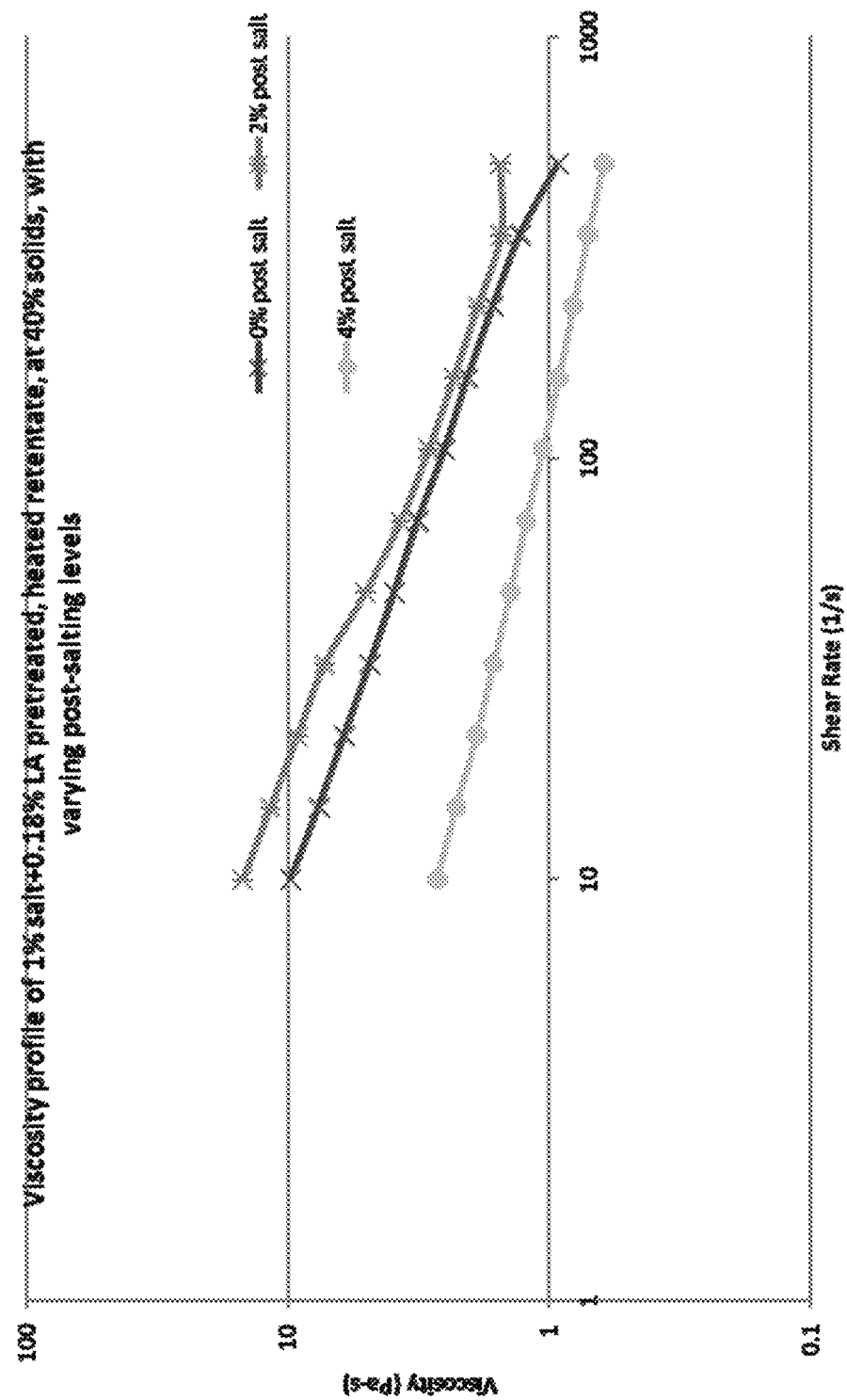
FIG. 6 is a graph showing the effects of salt and acid on the viscosities of retentates prepared from milk treated before and after ultrafiltration.

As shown in FIG. 6, it was found that post-ultrafiltration addition of 2 percent salt by weight of the retentate resulted in slightly higher retentate viscosities than the sample with no further salt addition, while addition of 4 percent salt was found to dramatically decrease retentate viscosity.

It is believed that by adding more salt, one increases the ionic strength of the mixture and the ions interfere with protein-protein interactions, which results in decreased viscosity. However, because salt is hygroscopic, the salt absorbs water and increases the solids level of the material. At a low added salt content (e.g., less than about 2.7 percent), the salt increases the solids level of the material. At higher salt content (e.g., at about 4.7 percent), the increased ionic strength results in decreased viscosity. It is believed that the viscosity will begin to increase at salt contents above about 5 percent due to the increased total solids. Also, for most food purposes, salting past 5 percent increases the salt content of the material beyond a practical usage limit.

Example 3

Post-UF Salting and Acidification Effect on Cold Retentate Viscosity

Figure 7:
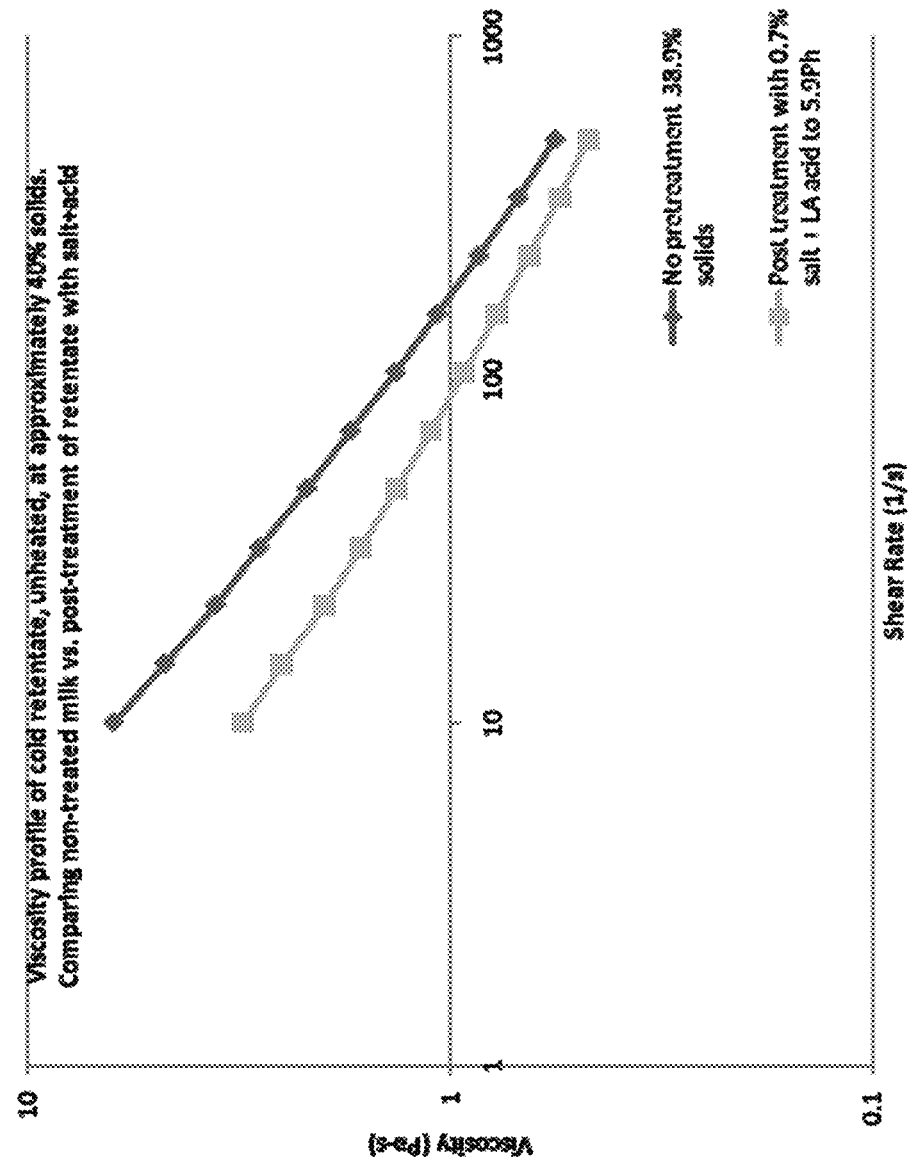
FIG. 7 is a graph showing the effects of salt and acid on the viscosities of retentates prepared from milk treated after ultrafiltration.

Non-pretreated whole milk was ultrafiltered as described in Example 1. A retentate having 38.9 percent solids was obtained. One sample of the retentate was left untreated. Another sample of the retentate was acidified with 0.18 percent lactic acid (88% solution) to pH 5.9 and mixed with 0.7 percent salt based on the weight of the retentate. The amount of salt added after ultrafiltration was selected to correspond to the amount of salt that would remain in the retentate after ultrafiltration if 1 percent salt had been added prior to ultrafiltration. The samples were not heated after ultrafiltration or treatment with acid and salt. The viscosity profiles of the untreated and treated retentate samples were measured as described in Example 1 and the data is presented in FIG. 7. The treated sample had lower viscosity than the untreated sample.

Example 4

Post-UF Heating Effect on Cold Retentate Viscosity

Whole milk was combined with 1 percent salt and acidified with 0.18 percent lactic acid (88% solution) to pH 5.9 and then ultrafiltered according to Example 1. Portions of the retentate were heated at the temperatures provided in Table 1 below and compared to an unheated sample to examine the effect of heating on viscosity. All of the selected heating parameters of samples B, C, and D were effective to reduce the aerobic plate count by at least two logs.

TABLE 1

| Sample | Solids Content | Heating Temp. | Time | d0 | d1 | Rate of Viscosity Increase from d0 to d1 ((Pa · s)/hr) |
|---|---|---|---|---|---|---|
| A | 39.6% | unheated | — | 3.578 | 13.04 | 0.39 |
| B | 39.7% | 155° F. | 200 seconds | 4.644 | 15.18 | 0.44 |
| C | 39.8% | 161° F. | 120 seconds | 6.954 | 19.97 | 0.54 |
| D | 39.6% | 168° F. | 40 seconds | 10.84 | 35.59 | 1.03 |

The viscosities of the samples were analyzed at time 0 (i.e., within two hours of ultrafiltration) and one day after heating. As shown in the chart of FIG. 8, it was found that long time, low temperature heating (sample B) was most similar to unheated sample A and provided the lowest viscosity. Samples C and D had acceptable viscosities at time zero but, by day 1, sample C had unacceptably high viscosity and sample D had formed a gel. Thus, the heating of samples C and D at 161° F. and 168° F. for 120 and 40 seconds, respectively, were unacceptable post-ultrafiltration heating steps for milk concentrates having almost 40 percent total solids. Sample B was fluid and pumpable at day 1, thereby having substantially increased usable life compared to samples C and D.

The rate of viscosity increase between time 0 and day 1 was temperature dependent, with the highest heat treatment (168° F.) resulting in the largest rate of viscosity increase of 1.03 (Pa·s)/hr and the lowest heat treatment (155° F.) resulting in the lowest rate of viscosity increase of 0.44 (Pa·s)/hr other than the unheated sample.

Example 5

Post-UF Heating Effect on Cold Retentate Viscosity

A whole milk concentrate having about 29 percent solids (approximately "3×" concentrated based on the total solids) was treated with 2 percent salt and acidified with 0.36 percent of an 88 percent lactic acid solution to pH 5.9. The treated milk concentrate was then ultrafiltered as described in Example 1 to provide retentates with the total solids contents listed in Table 2 below. Portions of the retentate were heated at the temperatures provided in Table 2 below and compared to an unheated sample to examine the effect of heating on viscosity over two days of refrigerated storage after ultrafiltration.

The viscosities of the four samples were measured at 45° F. at time 0 (within 2 hours of ultrafiltration) at a shear rate of 10 sec$^{-1}$ using a Haake VT550 Rheometer from Thermo Scientific. The samples were stored at 45° F. and then viscosities were measured at day 1 (within 20 to 30 hours after ultrafiltration) and day 2 (within 46 to 50 hours) after ultrafiltration) after placing in a 38° F. water bath just prior to measurement although the temperature of the samples was believed to be about 45° F. at the time of measurement. The rates of viscosity increase between time 0 to day 1, day 1 to day 2, and time 0 to day 2 for each sample were calculated and are presented in Table 3 below.

TABLE 2

| Sample | Solids Content | Temperature | Time (s) | d0 | d1 | d2 |
|---|---|---|---|---|---|---|
| A | 40.8% | unheated | — | 3.147 | 10.66 | 18.63 |
| B | 40.7% | 155° F. | 200 | 5.304 | 16.44 | 24.65 |
| C | 40.3% | 161° F. | 120 | 7.106 | 18.35 | 27.5 |
| D | 40.3% | 168° F. | 40 | 11.09 | 25.02 | 35.82 |

TABLE 3

| Sample | Viscosity rate increase between d0 and d1 ((Pa · s)/hr) | Viscosity rate increase between d1 and d2 ((Pa · s)/hr) | Viscosity rate increase between d0 and d2 ((Pa · s)/hr) |
|---|---|---|---|
| A | 0.31 | 0.33 | 0.32 |
| B | 0.46 | 0.34 | 0.40 |
| C | 0.47 | 0.38 | 0.42 |
| D | 0.58 | 0.45 | 0.52 |

As shown in the graph of FIG. 9, it was found that the viscosity of long time, low temperature heat treated sample B was significantly lower than the viscosity of shorter time, higher temperature heat treated sample D at time 0, day 1, and day 2. The rates of viscosity increase over 48 hours were similar for samples B and C. The rate of viscosity increase for sample D was significantly higher.

The viscosity of sample B at day 2 was higher than desirable for applications requiring pumpability. Sample C had viscosities slightly higher than those of sample B at time 0 and day 1, but the viscosity at day 1 is close to a viscosity at which the milk concentrate is no longer fluid and will not readily flow. For applications where fluidity is desired at certain time points post ultrafiltration, the solids content of the concentrate can be reduced to increase the length of time the concentrate remains fluid and/or adjust the temperature and time of the heat treatment step.

This example illustrates that long time, low temperature heat treatment will extend the amount of time the concentrate remains fluid by minimizing the rate at which the viscosity increases while also reducing the microbial load of the concentrate.

Example 6

Post-UF Reheating Effect on Cold Retentate Viscosity

Figure 10A:
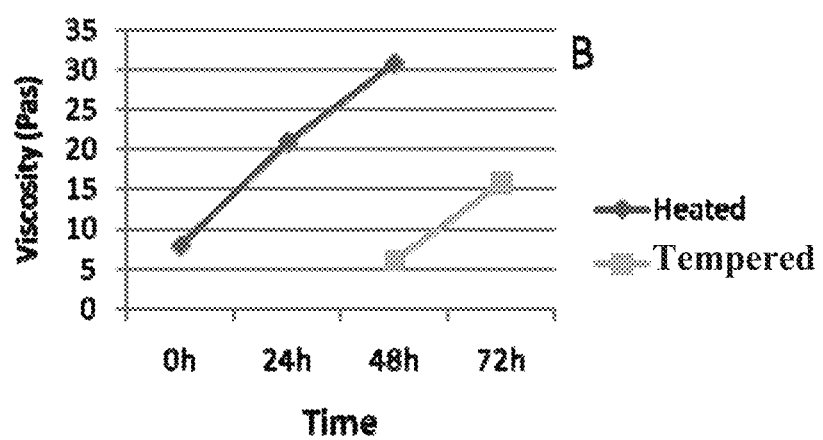
FIGS. 10(A)-(D) show the effects of reheating on the viscosity of treated concentrates over time.
Figure 10B:
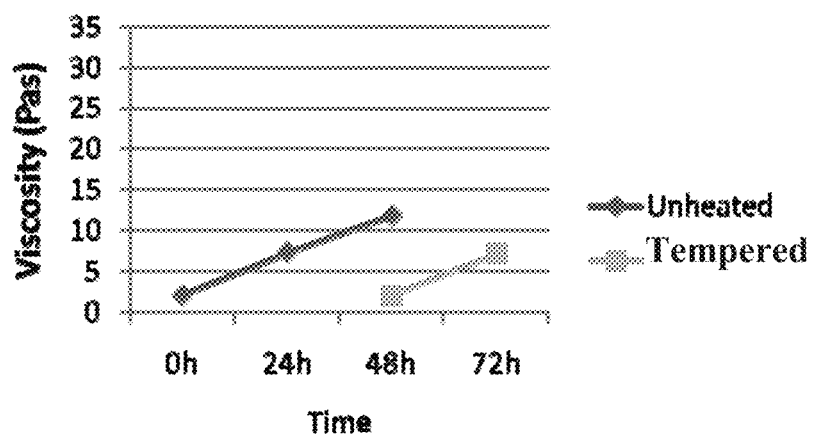

Whole milk was combined with 1 percent salt and acidified to pH 5.9 with 0.18 percent lactic acid (88% solution) for 15 hours and then ultrafiltered as described in Example 1 to provide a retentate with about 39 percent solids. A portion of the retentate was heated at 168° F. for 30 seconds (i.e., the "heated" samples). A second portion of the retentate was not heated (i.e., the "unheated" samples). Because of the heat treatment, the heated samples have a reduced microbial load compared to the unheated samples and generally would be more likely to be used in the food industry than unheated concentrates. The viscosities of the heated and unheated samples were measured at time 0, 24 hours, and 48 hours after ultrafiltration. The viscosities of the treated retentates were measured at 45° F. at a shear rate of 10 sec$^{-1}$ as described in Example 1. The viscosities of the heated and unheated samples are shown in FIGS. 10A and 10B, respectively, and the data is presented in Table 4 below.

hours after the post-UF heating step (i.e., from time 0 to 24 hours) was 0.54 Pa·s/hour while the rate of viscosity increase over 24 hours after the tempering step (i.e., from 48 hours to 72 hours) was 0.405 Pa·s/hour, which is a decrease of 25 percent. The viscosities of these samples are shown in FIG. 10A.

Forty-eight hours after ultrafiltration, the "unheated samples" were also tempered at 120° F. for 30 minutes and then cooled down to 45° F. This tempering was able to reset the viscosity to substantially the same viscosity as at time 0. The viscosity of the unheated sample after the tempering step at 48 hours was about 1 percent higher than the viscosity at time 0. The viscosity 24 hours after tempering (i.e., 72 hours after ultrafiltration) was slightly lower (7.18 Pa·s/hour) than the viscosity 24 hours after time 0 (7.31 Pa·s/hour). The viscosity at 72 hours (i.e., 24 hours after the tempering step) was 1.8 percent lower than the viscosity 24 hours after time 0 (i.e., 24 hours after time 0). The rate of viscosity increase over 24 hours after time 0 (i.e., from time 0 to 24 hours) was 0.218 Pa·s/hour while the rate of viscosity increase over 24 hours after the tempering step (i.e., from 48 hours to 72 hours) was 0.213 Pa·s/hour, which is a decrease of 2.3 percent. The viscosities of the unheated samples are shown in FIG. 10B.

While not wishing to be limited by theory, it is presently believed that the heated samples have lower viscosities upon tempering compared to the unheated samples because some of the proteins of the heated samples denature during the initial heating process. When tempering at 120° F., the proteins reconfigure to a conformation that is favorable for viscosity control. Therefore, the change in viscosity is more pronounced with the heated retentates. Further, heating may cause irreversible changes due to the nature of association/dissociation behavior of casein micelle proteins. Protein re-association in the case of casein micelles is not site specific, i.e., each dissociated protein does not return to its previous location on the casein micelle. This degree of irreversibility may, in turn, lead to subtle shifts in casein micelle size distributions and thus improve casein micelle packing efficiency with the effect of decreasing the extent of viscosity build at lower temperatures. An alternative explanation may involve the surface disulfide cross-linking by kappa-casein at casein micelle surfaces such that the vol-

TABLE 4

| | 0 hrs (Pa · s) | 24 hrs (Pa · s) | 48 hrs (Pa · s) | Tempering at 120° F. at 48 hrs (Pa · s) | 72 hrs (Pa · s) | Viscosity rate increase between 0-24 hrs ((Pa · s)/hr) | Viscosity rate increase between tempering at 48 hrs and 72 hrs ((Pa · s)/hr) |
|---|---|---|---|---|---|---|---|
| Unheated | 2.08 | 7.31 | 11.8 | 2.06 | 7.18 | 0.218 | 0.213 |
| Heated | 7.94 | 20.9 | 30.7 | 6.07 | 15.8 | 0.540 | 0.405 |

The heated samples had higher viscosities than the unheated samples at the same time points. It was surprisingly found that, 48 hours after ultrafiltration, tempering the "heated samples" at a temperature of 120° F. for 30 minutes using a water bath and then cooling the samples down to 45° F. was effective not only to substantially reduce the viscosity of the concentrate but also to reduce the viscosity to below the viscosity at time 0, resulting in a viscosity drop of about 23.5 percent below time 0. The viscosity at 72 hours (i.e., 24 hours after the tempering step) was 24.4 percent lower than the viscosity 24 hours after time 0 (i.e., 24 hours after the post-UF heating step). The rate of viscosity increase over 24 umes at higher temperatures may mechanically limit any volume increases at lower temperatures.

Retentate samples prepared as described above were also analyzed after a tempering step at 68° F., 86° F., 104° F., or 122° F. conducted 48 hours after time 0.

Figure 10C:
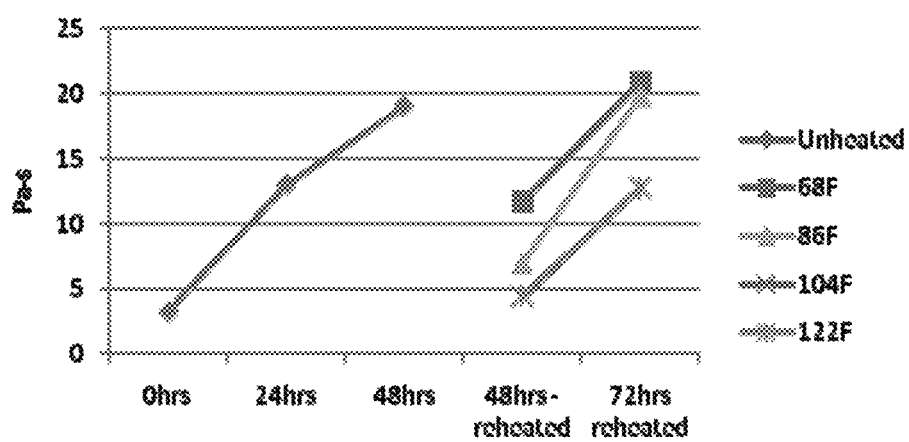
Figure 10D:
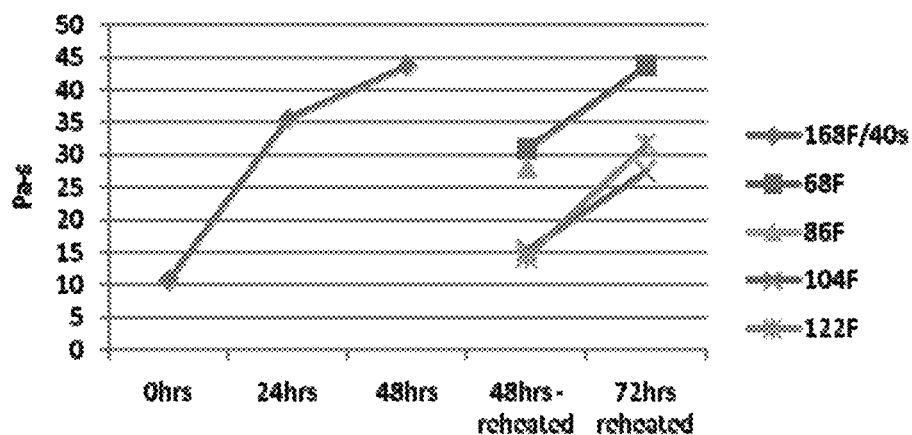

The viscosities of the heated and unheated samples were measured at time 0, 24 hours, and 48 hours after ultrafiltration. The samples were then tempered at 68° F., 86° F., 104° F., or 122° F. and then cooled to 45° F. The viscosities of the samples were measured at 45° F. at a shear rate of 10 sec$^{-1}$ as described in Example 1. The viscosities of the unheated and heated samples are shown in FIGS. 10C and 10D, respectively, and the data presented in Table 5 below.

TABLE 5

| | 0 hrs (Pa·s) | 24 hrs (Pa·s) | 48 hrs (Pa·s) | Tempering at 48 hrs (Pa·s) | 72 hours (Pa·s) | Viscosity rate increase between 0-24 hrs ((Pa·s)/hr) | Viscosity rate increase between tempering at 48 hrs and 72 hrs ((Pa·s)/hr) |
|---|---|---|---|---|---|---|---|
| Unheated (after UF) | 3.22 | 13 | 19 | — | — | 0.408 | — |
| Temper at 68° F. | — | — | — | 11.7 | 20.9 | — | 0.383 |
| Temper at 86° F. | — | — | — | 7.01 | 19.8 | — | 0.533 |
| Temper at 104° F. | — | — | — | 4.36 | 12.8 | — | 0.352 |
| Temper at 122° F. | — | — | — | 4.49 | 12.7 | — | 0.342 |
| Initial heat treatment after UF | 10.8 | 35.6 | 43.7 | — | — | 1.033 | — |
| Temper at 68° F. | — | — | — | 30.9 | 43.7 | — | 0.533 |
| Temper at 86° F. | — | — | — | 28.0 | NA | — | — |
| Temper at 104° F. | — | — | — | 15.3 | 27.5 | — | 0.508 |
| Temper at 122° F. | — | — | — | 14.3 | 31.7 | — | 0.725 |

The heated samples had higher viscosities than the unheated samples at the same time points. For both the heated and unheated samples, tempering at 104° F. and 122° F. provided the largest decrease in viscosity while tempering at 68° F. provided the lowest decrease in viscosity.

For the heated sample, the rate of viscosity increase over 24 hours after post-UF heating (i.e., from time 0 to 24 hours) was 1.033 Pa·s/hour while the rate of viscosity increase over 24 hours after the tempering step (i.e., from 48 hours to 72 hours) was 0.508 Pa·s/hour for tempering at 104° F. and 0.725 Pa·s/hour for tempering at 122° F. This is a viscosity rate decrease of 50.7 percent for the 104° F. tempering step and 29.6 percent for the 122° F. tempering step.

For the unheated samples, the rate of viscosity increase over 24 hours after time 0 (i.e., from time 0 to 24 hours) was 0.408 Pa·s/hour while the rate of viscosity increase over 24 hours after the tempering step (i.e., from 48 hours to 72 hours) was 0.352 Pa·s/hour for the 104° F. treatment and 0.342 Pa·s/hour for the 122° F. treatment. This is a viscosity rate decrease of 13.7 percent for the 104° F. tempering step and 16.2 percent for the 122° F. tempering.

Example 7

Identification of Cold Viscosity Drivers

Treated whole milk retentate was prepared by adding 1 percent NaCl and lactic acid to a pH of 5.9 according to Example 1. The retentate was separated into batches and heat treated at eight different time/temperature combinations as listed below in Table 6. Heat treatments were performed using MicroThermics equipment (allows precise control of temperature and hold time) at a flow rate of 1.5 m$^{-1}$ and outlet temperature of about 100° F. Samples were collected and submitted for micro plate counts while evaluating cold viscosities. Cold viscosities were measured over a period of 48 hours at 45° F. with the Haake VT550, Geometry SV1 and SV2 using a shear rate sweep.

As shown in Table 6 below, heating at 155° F. for 200 seconds was found to be very effective on SPC and coliform count reduction.

TABLE 6

| Heat Treatment (Bulk Flow Time) | SPC (CFU/g) | Coliform (CFU/g) |
|---|---|---|
| Unheated #1 | 220,000 | 160,000 |
| 161° F./80 s | 5,200 | 10 |
| 164° F./80 s | 7,100 | 10 |
| 168° F./40 s | 6,000 | 10 |
| 170° F./40 s | 3,500 | 10 |
| Unheated #2 | 130,000 | 15,000 |
| 146° F./200 s | 40 | 10 |
| 150° F./200 s | 40 | 10 |
| 155° F./200 s | 30 | 10 |
| 160° F./200 s | 80 | 10 |

Heat-treated retentate samples were then further characterized by particle size, microscopy, centrifugation and disulfide cross-linking to better understand the effects of post-UF heat treatment on retentate viscosity.

As explained in greater detail below, the experiments showed that the relationship of retentate heat treatment can be correlated with the extent of time-dependent viscosity increase. The experiments also indicated that the relationship of retentate heat treatment with time-dependent viscosity increase was not related to increases in disulfide cross-linking nor fat droplet size reduction. The microstructural similarities in combination with centrifugation indicate there was little difference in protein network interaction as a result of heat treatment. Accordingly, it is hypothesized that non-covalent interactions between proteins are responsible for the viscosity increase.

Particle Size Distribution.

Retentate samples were dispersed in 1% SDS using 1 gram sample with 9 grams 1% SDS. The SDS-dispersed sample was added dropwise into a Horiba LA-300 laser diffraction reservoir. The measurements used the relative refractive index of 1.10-0.00i, which is the ratio of the dispersed phased to the continuous phase. In this case the relative refractive index results from the ratio of the triglyceride refractive index (n=1.46) over the refractive index of water (n=1.33). The SDS solution dissolves the protein to particle sizes essentially invisible to static laser diffraction so the only particles contributing to the size distribution are fat droplets.

Figure 11:
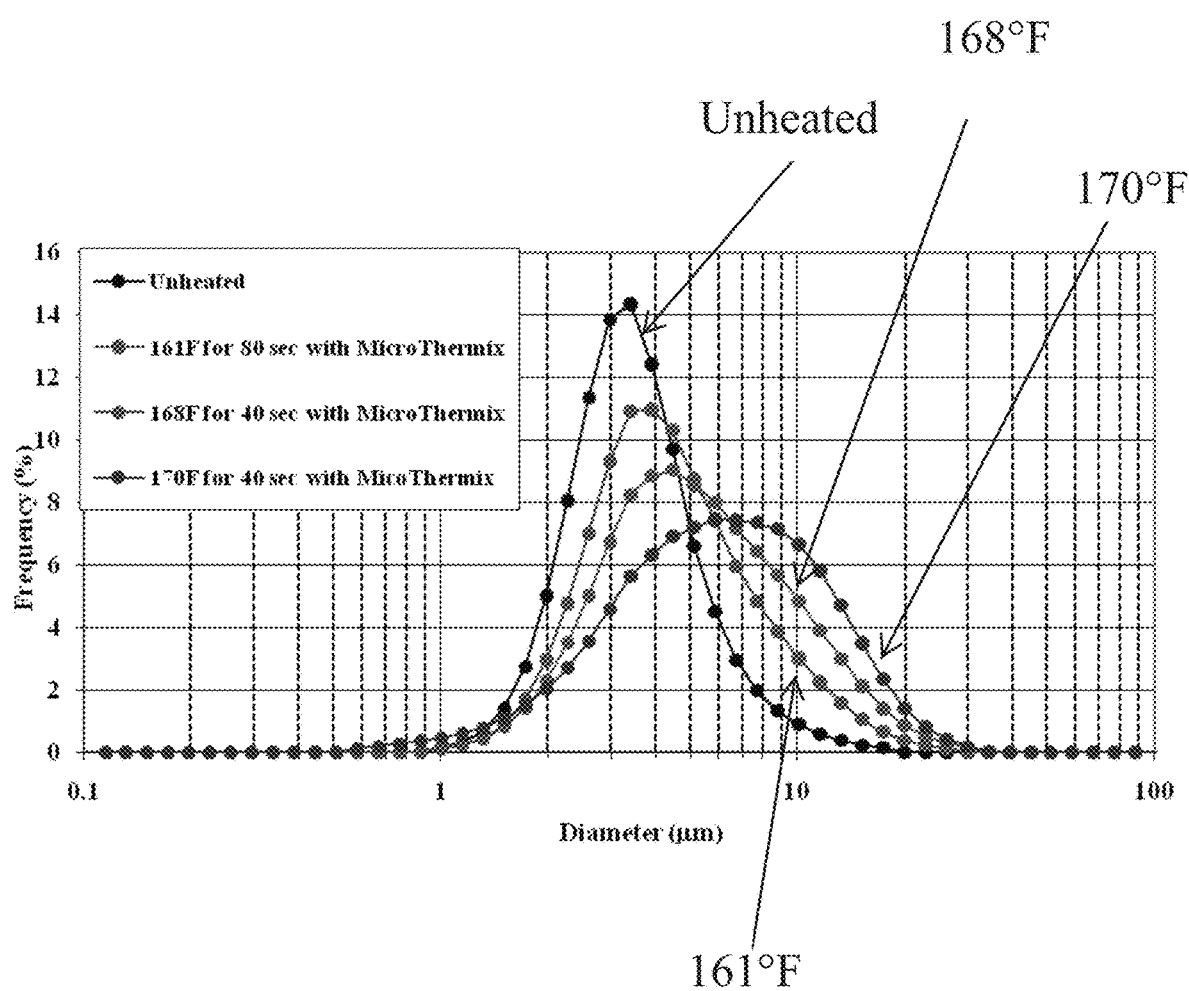
FIG. 11 includes confocal microscope images showing the microstructure of the protein network of retentate samples at day 1 and day 4 for heated and unheated samples.

The fat droplet size distributions are shown in FIG. 11. Particle size analysis showed a narrow range of fat droplet size distributions with an average diameter centered near 5 µm. Although both flow rate and temperature treatments were varied in the MicroThermics, the particle size data demonstrated a tendency for fat droplet size distributions to increase with higher temperatures. Usually larger viscosities are associated with smaller particles size distributions. Therefore, the fact that the higher temperatures result in larger fat droplets sizes indicates the larger viscosities associated with high temperature treatments is not attributable to smaller fat droplets.

Microscopy.

Confocal laser scanning microscopy was used to evaluate protein distribution in selected retentate samples. The samples were heated at 168° F. for 40 seconds. The retentates were stained for both protein and lipid using fluorescent dyes Fast Green FCF and Nile Blue, respectively. Samples were imaged using a Leica DM5000B confocal microscope with excitation/emission wavelengths of 488/500-570 nm for Nile Blue and 633/650-750 nm for Fast Green FCF. Images were subsequently processed using Image-Pro Plus software (version 5.1.0.20).

Figure 12:
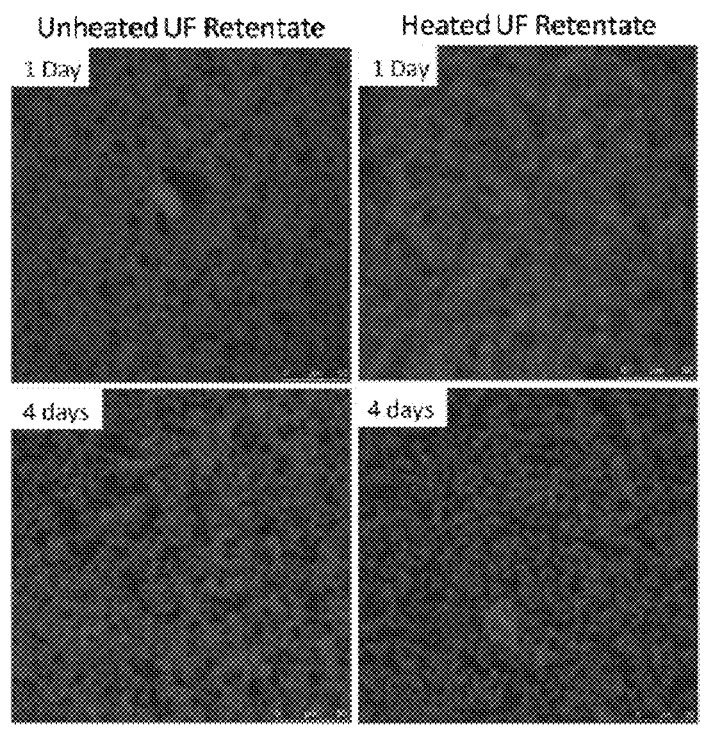
FIG. 12 is a graph showing fat droplet size distribution of retentate samples heated at different temperatures.

The microstructure of the protein network of the retentate samples as shown in the confocal images indicated subtle protein microstructural transformations during cold storage as shown by the protein stained samples in FIG. 12. Differences in the protein microstructure are observed at 1 day in the unheated versus heated UF retentates, but both heated and unheated samples are similar after 4 days. Retentate heat treatments may induce or accelerate the formation of a more aggregated/granular protein network that requires more time to form in the unheated retentate sample.

Centrifugation.

30 grams of selected retentates (unheated; 161° F./80 s; 164° F./80 s; 168° F./40 s) were placed in sample tubes suitable for the SW-28 rotor used in the Beckman Ultracentrifuge (Optima LE-80). The samples were spun at 100,000×g for up to 1 hour at 25° C. or 4° C. The centrifugation test provides information regarding the interaction strength of fat droplets with the protein. The amount of fat accumulating at the top of the sample indicates the degree of fat droplet interaction with the protein matrix.

Centrifugation showed that retentate heat treatment has minimal impact on protein-fat droplet interactions since there was no observable fat separation after 100,000×g centrifugation and essentially no observable differences between heated and unheated retentates. In fact, these retentates did not produce a separation of any kind which indicates the proteins and fat droplets are so concentrated that there is no aqueous phase separation.

Disulfide Cross-Linking.

Selected samples were analyzed for the degree of disulfide bond formation occurring with β-lactoglobulin (BLG). As mentioned above, post-UF heat treatment seemed to accelerate the viscosity build over time and viscosities were higher for samples treated at higher temperatures. Therefore, it was investigated whether disulfide crosslinking was contributing to this viscosity behavior. Formation of covalent disulfide crosslinks requires BLG unfolding, which typically occurs through heating at temperatures greater than 60° C. This test was performed with the Agilent 2100 Bioanalyzer from Agilent Technologies (Santa Clara, Calif.). The samples were treated with and without a disulfide reducing agent (DTT-dithiothreitol). The results were reported in percent crosslinked BLG, which was observed as a depletion of monomeric (non-crosslinked) BLG.

Protein profile analysis typically showed about 43 percent BLG crosslinking regardless of the temperature of heat treatment, which indicated that the tested post-UF heat treatment temperatures/holding time combinations did not cause significant protein denaturation that could induce gelation. The degree of BLG cross-linking remained unchanged from the starting milk. The cross-linking measurements showed that retentate viscosity increases are not attributed to increasing covalent whey protein interactions.

Example 8

Time Dependent Changes in Cold Viscosity

Time dependent viscosity increases during cold storage can compromise the pumpability of high solids UF retentate. Further experiments were conducted to investigate the mechanistic aspects underlying this behavior and to identify ways to control it.

Figure 13:
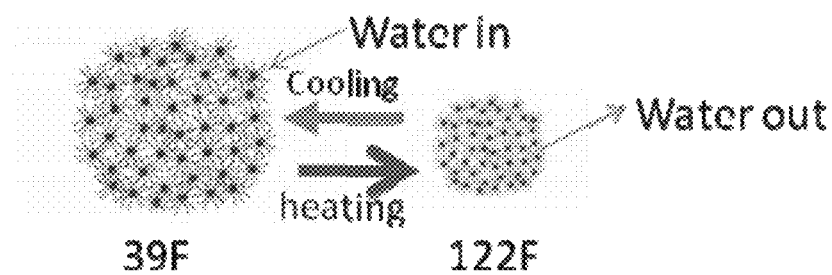
FIG. 13 is a schematic showing a proposed mechanism of casein micelle diameter changes as a function of temperature.

Casein micelles typically hold about 3.7 grams of water per gram of casein protein (Dewan, R. K., Bloomfield, V. A., Chudgar, A. and Morr, C. V., Viscosity and voluminosity of bovine milk casein micelles, J. Dairy Sci., 56, 699-705 (1972)), which is hereby incorporated by reference) and this value is temperature dependent (Walstra, P. and Jenness, R., Dairy Chemistry and Physics, $1^{st}$ Edition, John Wiley & Sons, New York, N.Y. (1984)). It is proposed that temperature reduction experienced through cold storage promotes hydrogen bonding and weakens hydrophobic interactions, which allows micelles to incorporate more water and increase their average volume as illustrated in FIG. 13. The concomitant decrease in the amount of water in the continuous phase thus limits particle/casein micelle mobility that is responsible for the viscosity increase (e.g., in 40 percent total solids UF retentate at 45° F., only 13 percent of the total water is available for other proteins, lactose and minerals, and at low temperature even less water is available).

Retentate Viscosity Behavior.

Figure 14:
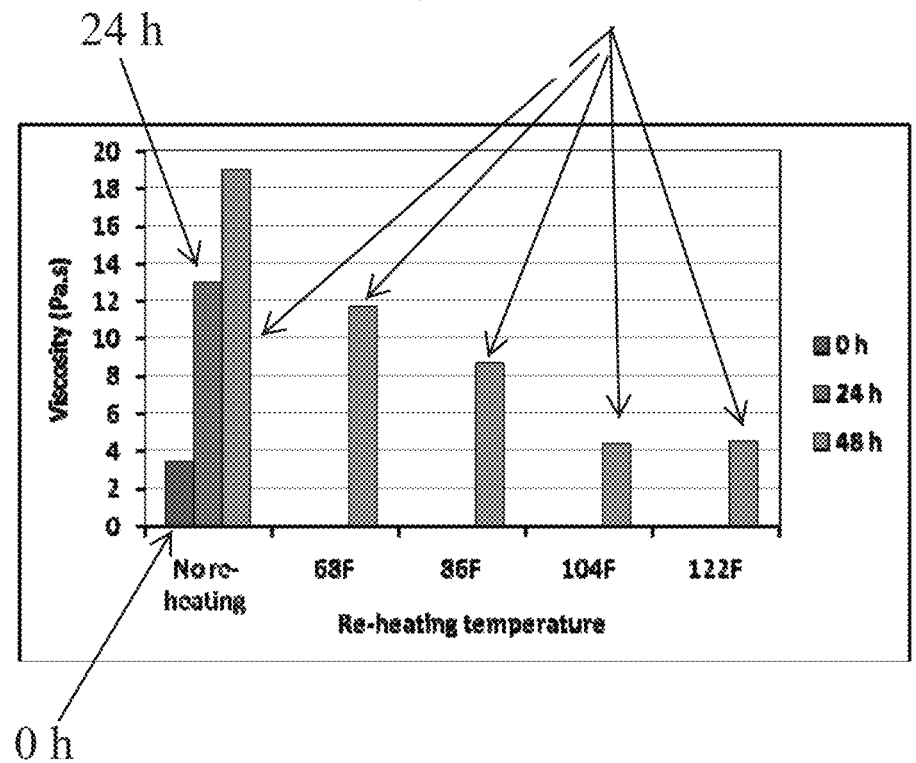
FIG. 14 is a graph comparing the cold viscosity of retentate samples after 48 hours of storage at 39° F. and reheating at 68° F., 86° F., 104° F., and 122° F.

To investigate the proposed mechanism, the cold viscosities of retentate samples prepared from pretreated whole milk as described in Example 1 were measured over a period of 48 hours. After 48 hours, the heated and unheated samples were each divided into 4 batches (for a total of 8 samples) and each batch was tempered to 68° F., 86° F., 104° F., and 122° F., respectively, and then cooled to 39° F. Cold viscosity measurements were performed on the same day. The tempering treatment decreased the cold viscosities of all samples. The extent of the viscosity decrease depended on the temperature of the tempering step as shown in FIG. 14. For example, there was a 75 percent decrease in viscosity when the retentate was tempered at 104° F. and 122° F. Tempering at lower temperatures (68° F. and 86° F.) has lesser effect at decreasing the viscosity.

Casein Micelle Size.

Changes in micelle size as a function of temperature was measured by dynamic light scattering (DLS). Permeate from UF whole milk was adjusted to pH 5.9 with lactic acid and 1 percent NaCl and filtered with 0.2 µm syringe filters. Subsequently, 100 µl of skim milk was diluted into 25 ml of the filtered permeate and incubated in a water bath either at 39° F. or 122° F. for 10 minutes. Then 3 ml of sample was quickly transferred to a cuvette to measure the average casein micelle diameter by DLS using a Malvern ZetaSizer 3000HSa. All measurements were done in triplicate (i.e., 3 aliquots of same solution).

As shown in FIG. 15, it was found that micelle size decreased with increasing temperature as measured by DLS. This reduction is believed to be attributable to increased hydrophobic interactions. In addition, it is thought that the exchange of water between the micelles and the continuous phase is gradual and time is needed to reach equilibrium.

The amount of water incorporated into the micelles was estimated using skim milk. Skim milk containing 0.18 percent lactic acid (pH 5.9) and 1 percent NaCl was centrifuged at 100,000×g for 1 h at 39° F. and 77° F. Supernatants and pellets were separated and analyzed further.

FIG. 16 shows the relationship between casein micelle size and the water to casein ratio of pellets after centrifugation for 1 hour at 100,000×g of milk containing 1 percent salt at pH 5.9. The larger micelle diameters at lower temperatures imply there is more water incorporation into the micelles. This volume change can be an important factor in retentates where swollen casein micelles impede flow and thus correlate with increases in cold viscosity over time. This temperature dependence of volume change is reversible and is consistent with the temperature dependent behavior of retentates shown in FIG. 15. Reheating the retentates may expel water, which may then be reabsorbed upon cooling.

Understanding the Pre-UF Treatment Effects on Retentate Behavior.

Without any pre-treatment, high solids UF retentates typically gel within 24 h (i.e., viscosity >25 Pa·s). It was hypothesized that pre-UF treatments may affect casein micelle size if micelle size reduction is accompanied by reducing its water absorption capacity at lower temperatures, thus leading to lower viscosities due to better protein packing.

Milk Partitioning.

0.18% lactic acid and 1% NaCl were added to 1× skim milk and then incubated at 39° F. for 10 minutes, 30 minutes, 1 hour, and 24 hours. Samples were then centrifuged at 100,000×g for 1 hour at 39° F. and 77° F. Pellets and supernatants were separated and their masses were recorded. These phases were submitted for protein profile analysis and also for protein, moisture, sodium and calcium content. The protein profile analysis was completed using the Agilent 2100 Bioanalyzer from Agilent Technologies (Santa Clara, Calif.).

Casein Micelle Diameter Measurements.

Aliquots of UF permeate from pilot plant produced retentates were adjusted to 0.5 percent, 1 percent, and 2 percent NaCl (w/w). Permeate aliquots were titrated with 10 percent lactic acid to a range of pH values from 4.8 to 6.8 and filtered with a sequence of 0.45 μm and 0.2 μm syringe filters. Finally, 100 μl of skim milk were added to a 25 ml volumetric flask and brought to 25 mL with the various permeates. 3 ml were then transferred to cuvettes and the hydrodynamic diameters were subsequently measured by dynamic light scattering (DLS) (Malvern Zeta Sizer 3000HSa). Measurements were done in triplicate.

Figure 17:
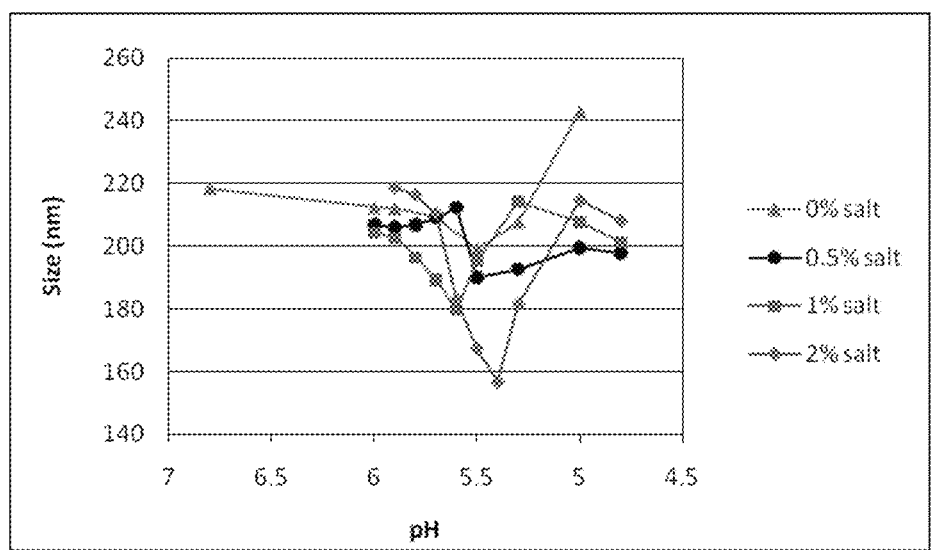
FIG. 17 is graph showing micelle size measurements as a function of pH at three different salt concentrations.

It was found that pre-UF treatment affects micelle size and delays aggregation while reducing steric repulsions. This behavior appeared to be sensitive to ionic strength. As shown in FIG. 17, high ionic strength delays pH of aggregation, and higher ionic strength was correlated to smaller average micelle size. Compared with the control (no salt) the smallest micelles size diameter was observed at pH 5.5 for 0.5 percent NaCl (195 nm), pH 5.6 for 1 percent NaCl (183 nm), and pH 5.4 for 2 percent NaCl (157 nm).

Figure 18A:
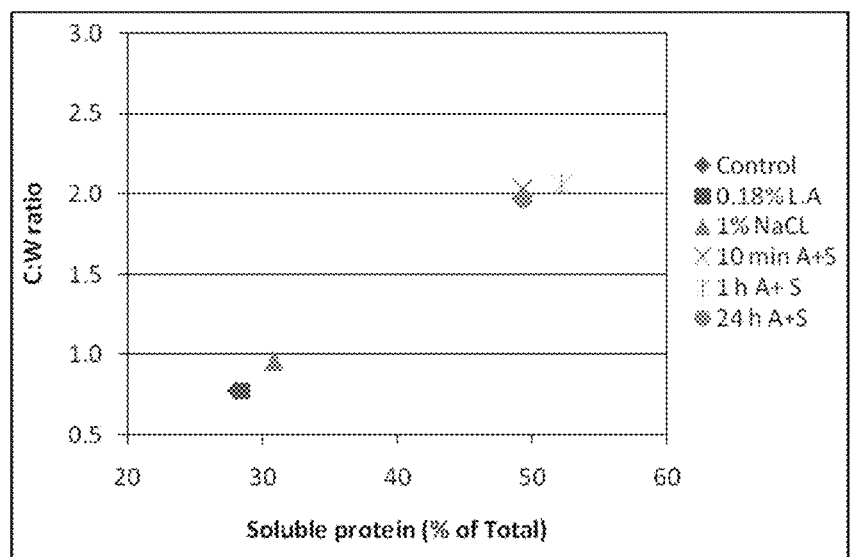
FIGS. 18A and B show the relationship between casein:whey ratio and soluble protein after centrifugation at 100,000×g for 1 hour at 77° F.
Figure 18B:
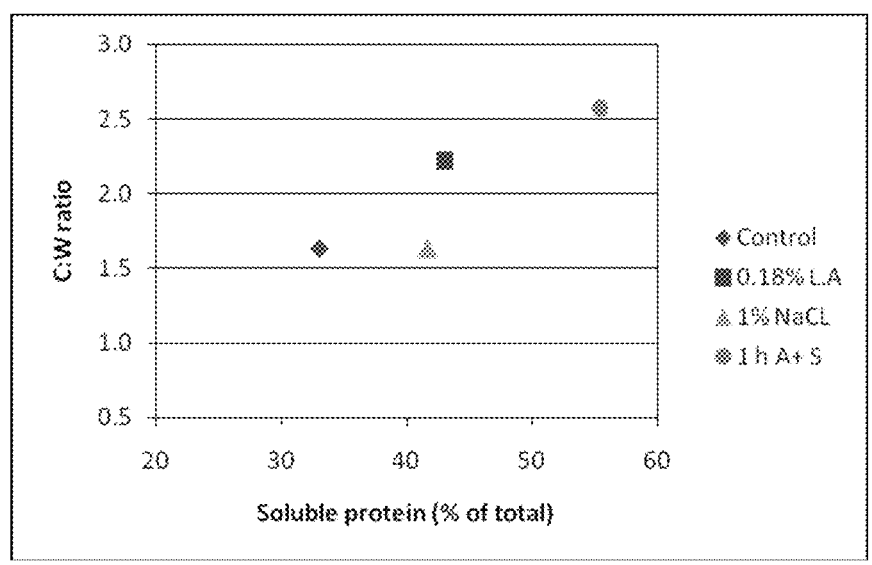
(FIG. 18B).

Size reduction can be attributed to the collapse of κ-casein (hairy layer) and the decrease in molecular weight due to protein dissociation from micelles. The combination of low pH and NaCl increased the amount of dissociated protein (soluble protein) by about 20 percent and no effect of cure time was observed, as can be seen in FIGS. 18A and B. FIG. 18A shows the relationship between casein:whey and soluble protein after centrifugation at 77° F. and FIG. 18B shows the relationship between casein:whey and soluble protein after centrifugation at 39° F. The percentages were calculated with respect to the total protein in skim milk.

The casein:whey ratio increased proportionally to soluble protein, showing a non additive effect of the pre-treatment. Samples centrifuged at 39° F. showed an increase in both casein:whey ratio and soluble protein due to the dissociation of β-casein. This observation indicates that low temperature also contributes to the observed effects of the pre-treatment, and cold storage of UF retentate could be beneficial for retentate functionalization.

Figure 19A:
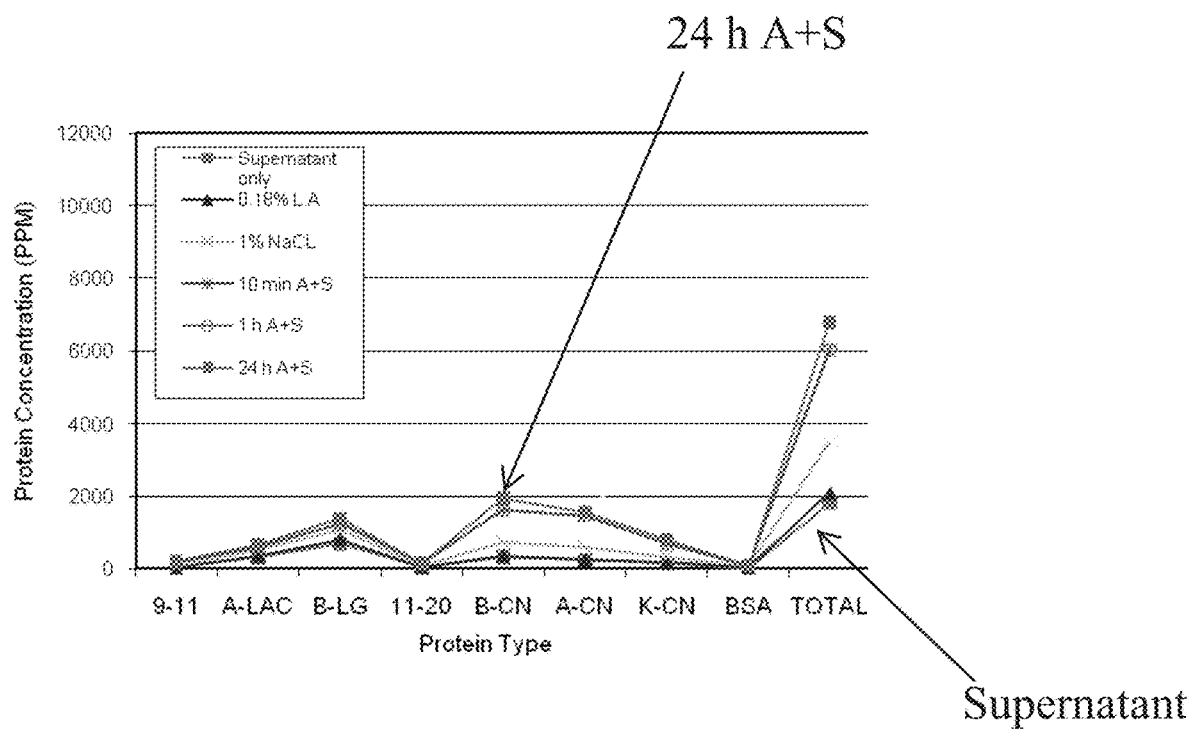
FIGS. 19A and B show the soluble protein profile of 1× skim milk supernatants after 1 hour of centrifugation at 100,000×g at 77° F.
Figure 19B:
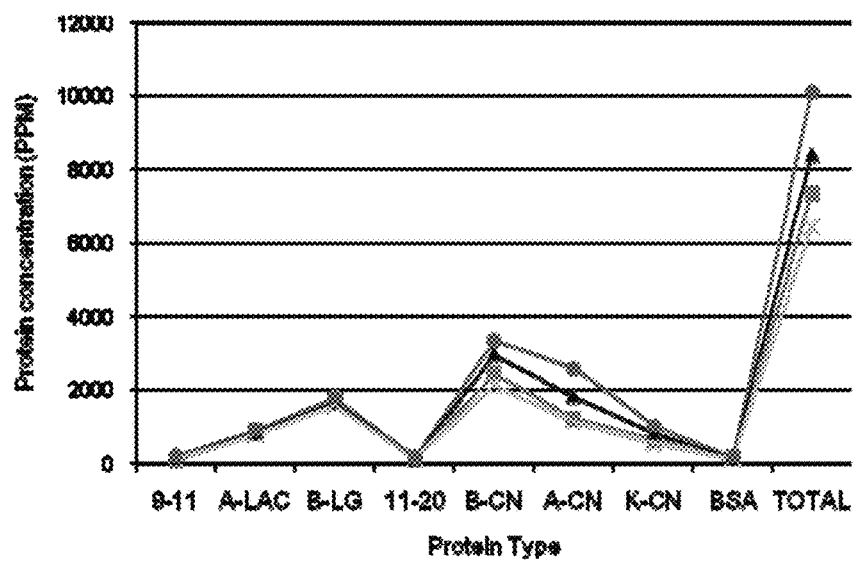
(FIG. 19B).

Further observations showed that the combination of low pH and 1 percent salt have a significant effect on the solubility of β-casein and α-casein (as shown in FIGS. 21A and B), and cure time did not show a significant difference as mentioned above. The soluble protein profile of 1× skim milk supernatants after 1 hour centrifugation at 100,000×g at 77° F. (FIG. 19A) and 39° F. (FIG. 19B) was examined. The abbreviations in the graph are as follows: "9-11" is casein fragments with a MW of 9-11 kDa; "A-LAC" is alpha-lactoglobulin; "B-LG" is beta-lactoglobulin; "11-20" is casein fragments with a MW of 11-20 kDa; "B-CN" is beta-casein; "A-CN" is alpha-casein; "K-CN" is kappa-casein; and "BSA" is bovine serum albumin.

Figure 20A:
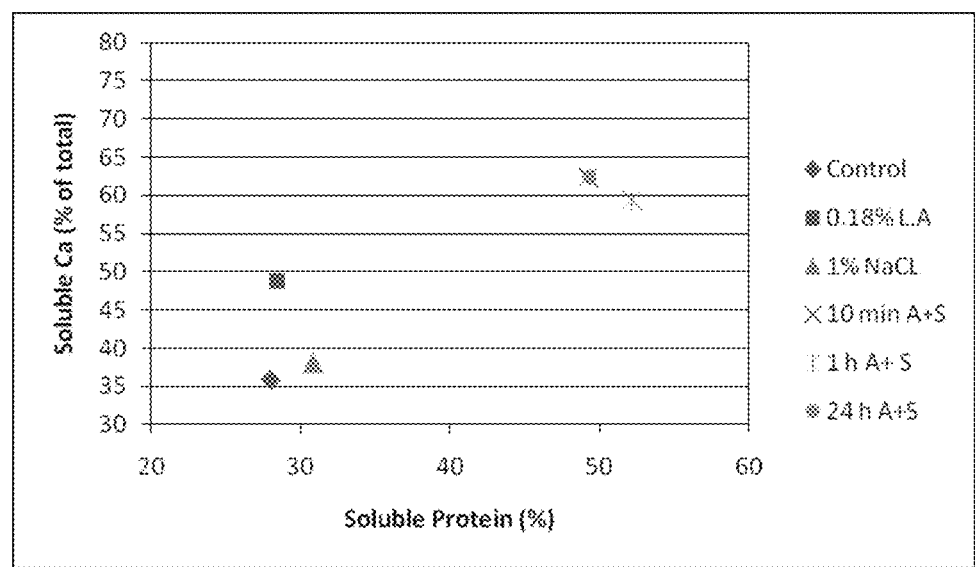
FIGS. 20A and B show the relationship between soluble calcium and soluble protein after 1 hour of centrifugation at 100,000×g at 77° F.
Figure 20B:
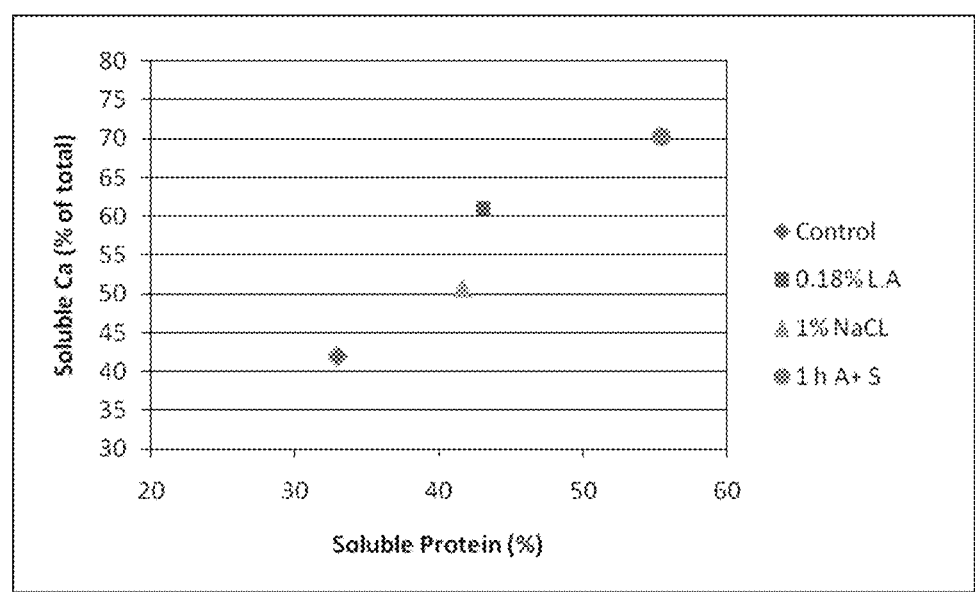
(FIG. 20B).

Due to the increase in soluble protein, it was also necessary to look at the relationship between the calcium and the soluble protein to observe if the addition of salt in combination with lower pH helped to dissociate calcium from casein micelles contributing to protein solubility. Acidification alone showed that the amount of soluble calcium was not necessarily correlated with soluble protein. The combination of acid and salt, however, showed the highest protein solubility and about 30 percent more soluble calcium compared to the control (FIG. 20A). However, at lower temperature (FIG. 20B), the amount of soluble calcium increased proportionally for all the treatments due to calcium being more soluble at low temperature. This can be important because pre-treatment is done at 39° F., which affects the impact of pH and ionic strength on the milk proteins, and also indicates that treatments at low temperatures would be a good option for retentate functionalization.

It will be understood that various changes in the details, materials, and arrangements of the process, formulations, and ingredients thereof, which have been herein described and illustrated in order to explain the nature of the method and milk concentrates, may be made by those skilled in the art within the principle and scope of the embodied method as expressed in the appended claims.

What is claimed is:

1. A method for delaying age gelation of a high solids milk concentrate by slowing the rate of viscosity increase during storage at refrigeration temperatures, the method comprising:

adding sodium chloride and/or potassium chloride to a concentrated dairy liquid in an amount of about 0.25 to about 4.6 percent sodium chloride and/or potassium chloride by weight of the concentrated dairy liquid;

adding one or more of lactic acid, hydrochloric acid, and phosphoric acid to the concentrated dairy liquid in an amount sufficient to provide a pH of about 4.6 to about 6.7;

heating the concentrated dairy liquid having a solids content of about 33 to about 43 percent at a temperature of about 140 to about 170° F. wherein the heating step is conducted for a time effective to achieve an at least 2 log reduction in vegetative pathogenic and spoilage organisms; and cooling the concentrated dairy liquid to about 55° F. or less to provide a cooled concentrated dairy liquid having a solids content of about 33 to about 43 percent, the heating and cooling steps being effective to provide an initial viscosity of the concentrated dairy liquid of less than 20 Pa·s which remains below 20 Pa·s for at least 24 hours at 45° F. or less, and the sodium chloride and/or potassium chloride addition and acid addition being in amounts effective to reduce the viscosity of the concentrated dairy liquid as compared to a concentrated dairy liquid prepared without addition of acid and without addition of sodium chloride and/or potassium chloride.

2. The method according to claim 1, wherein the heating step is effective to provide a viscosity rate increase after cooling of about 0.54 Pas/hour or less.

3. The method according to claim 1, wherein the heating step is effective to provide a viscosity rate increase after cooling of about 0.47 Pas/hour or less.

4. The method according to claim 1, wherein the heating step is conducted for a time effective to achieve an at least 3 log reduction in vegetative pathogenic and spoilage organisms.

5. The method according to claim 1, wherein the concentrated dairy liquid has a solids content of about 33 to about 35 percent.

6. The method according to claim 1, wherein the heating step is carried out at a temperature of about 140 to about 170° F. when the concentrated dairy liquid has a solids content of about 36 to about 38 percent.

7. The method according to claim 1, wherein the heating step is carried out at a temperature of about 140 to about 165° F. when the concentrated dairy liquid has a solids content of about 39 to about 41 percent.

8. The method according to claim 1, wherein the heating step is carried out at a temperature of about 140 to about 161° F. when the concentrated dairy liquid has a solids content of about 42 to about 43 percent.

9. The method according to claim 1, the method further comprising tempering the cooled concentrated dairy liquid when the initial viscosity of the cooled concentrated dairy liquid has risen to a subsequent viscosity of at least about 20 Pa·s by increasing the temperature of the cooled concentrated dairy liquid to about 68 to about 130° F. and cooling the tempered concentrated dairy liquid to about 55° F. or less, the tempering effective to provide a tempered viscosity after cooling that is less than about 20 Pa·s.

10. The method according to claim 9, wherein the tempering step is effective to provide a tempered viscosity after cooling that is less than about 15 Pa·s.

11. The method according to claim 9, wherein the tempering step is effective to provide a tempered viscosity after cooling that is less than about 10 Pa·s.

12. The method according to claim 9, wherein tempering reduces the tempered viscosity of the concentrated dairy liquid to within about 45 percent of the initial viscosity.

13. The method according to claim 9, wherein tempering reduces the tempered viscosity of the concentrated dairy liquid to less than the initial viscosity.

14. The method according to claim 9, the method further comprising at least a second tempering step when the tempered viscosity of the concentrated dairy liquid has increased to a second subsequent viscosity of at least about 20 Pa·s, the at least second tempering step comprising increasing the temperature of the tempered cooled concentrated dairy liquid to a temperature of about 68 to about 130° F. and cooling the tempered concentrated dairy liquid to about 55° F. or less, the at least second tempering step effective to provide a second tempered viscosity after cooling that is less than about 20 Pa·s.

15. A method for reducing the viscosity of a high solids milk concentrate, the method comprising:

treating a dairy liquid with about 0.25 to about 6 percent sodium chloride and/or potassium chloride and adding one or more of lactic acid, hydrochloric acid, and phosphoric acid to the dairy liquid to provide a treated dairy liquid having a pH of about 4.6 to about 6.7;

concentrating the treated dairy liquid to a solids content of about 33 to about 43 percent and a total added sodium chloride and/or potassium chloride content of about 0.5 to about 4.6 percent;

heating the treated, concentrated dairy liquid at about 140° F. to about 170° F. for a time effective to provide at least a 2 log reduction of vegetative pathogenic and spoilage organisms; and cooling the concentrated dairy liquid to about 55° F. or less to provide a cooled concentrated dairy liquid having a solids content of about 33 to about 43 percent, the heating and cooling steps being effective to provide an initial viscosity of the concentrated dairy liquid of less than 20 Pa·s which remains below 20 Pa·s for at least 24 hours at 45° F. or less, and the sodium chloride and/or potassium chloride treatment and acid addition to the dairy liquid being in amounts effective to reduce the viscosity of the concentrated dairy liquid as compared to a concentrated dairy liquid prepared from a dairy liquid without sodium chloride and/or potassium chloride treatment and without the addition of acid.

16. The method according to claim 15, wherein the concentrated dairy liquid has a solids content of about 33 to about 35 percent.

17. The method according to claim 15, wherein the heating step is carried out at a temperature of about 140 to about 170° F. when the concentrated dairy liquid has a solids content of about 36 to about 38 percent.

18. The method according to claim 15, wherein the heating step is carried out at a temperature of about 140 to about 165° F. when the concentrated dairy liquid has a solids content of about 39 to about 41 percent.

19. The method according to claim 15, wherein the heating step is carried out at a temperature of about 140 to about 161° F. when the concentrated dairy liquid has a solids content of about 42 to about 43 percent.

20. The method according to claim 15, wherein the dairy liquid is concentrated by ultrafiltration, microfiltration, diafiltration, or a combination thereof.

21. The method according to claim 15, wherein the dairy liquid is selected from the group consisting of whole milk, reduced fat milk, skim milk, and combinations thereof.

22. A method for delaying age gelation of a high solids milk concentrate by slowing the rate of viscosity increase during storage at refrigeration temperatures, the method comprising:

adding one or more of lactic acid, hydrochloric acid, and phosphoric acid to a concentrated dairy liquid in an amount sufficient to provide a pH of about 4.6 to about 6.7 and adding 0.5 to about 4.6 percent sodium chloride and/or potassium chloride to the concentrated liquid, wherein the sodium chloride and/or potassium chloride addition and acid addition are in amounts effective to reduce the viscosity of the concentrated dairy liquid as compared to a concentrated dairy liquid prepared without the addition of acid and without the addition of sodium chloride and/or potassium chloride;

heating the concentrated dairy liquid having a solids content of about 33 to about 43 percent at a temperature of about 140 to about 161° F. wherein the heating step is conducted for a time effective to achieve an at least 2 log reduction in vegetative pathogenic and spoilage organisms; and cooling the concentrated dairy liquid to about 45° F. or less to provide a cooled concentrated dairy liquid having a solids content of about 33 to about 43 percent, a pH of about 4.6 to about 6.7, the heating and cooling steps being effective to provide an initial viscosity of the concentrated dairy liquid of less than 20 Pa·s which remains below 20 Pa·s for at least 24 hours at 45° F. or less, and tempering the cooled concentrated dairy liquid when the initial viscosity of the cooled concentrated dairy liquid has risen to a subsequent viscosity of at least about 20 Pa·s by increasing the temperature of the cooled concentrated dairy liquid to about 68 to about 130° F. and cooling the tempered concentrated dairy liquid to about 55° F. or less, the tempering effective to provide a tempered viscosity after cooling that is less than about 20 Pa·s.

23. The method according to claim 22, wherein the concentrated dairy liquid has a solids content of about 35 to about 43 percent.

24. The method according to claim 22, wherein the concentrated dairy liquid has a solids content of about 35 to about 40 percent.

25. The method according to claim 22, wherein the dairy liquid is selected from the group consisting of whole milk, reduced fat milk, skim milk, and combinations thereof.

26. The method according to claim 22, wherein the concentrated dairy liquid has a pH of about 4.6 to about 6.2.

27. The method according to claim 22, wherein the concentrated dairy liquid includes about 12 to about 17 percent protein, about 14.6 to about 20.1 percent fat, and about 3.5 to about 4.5 percent lactose.

28. The method according to claim 15, wherein the concentrating step comprises ultrafiltration carried out with a baseline pressure of about 5 to about 60 psi and a temperature of about 120 to about 135° F. to provide a concentrated dairy liquid that includes about 12 to about 17 percent protein, about 14.6 to about 20.1 percent fat, and about 3.5 to about 4.5 percent lactose.

* * * * *

UNITED STATES PATENT AND TRADEMARK OFFICE
CERTIFICATE OF CORRECTION

PATENT NO. : 10,721,940 B2  
APPLICATION NO. : 13/554604  
DATED : July 28, 2020  
INVENTOR(S) : Ammar N. Chinwalla et al.

Page 1 of 1

It is certified that error appears in the above-identified patent and that said Letters Patent is hereby corrected as shown below:

In the Claims

Claim 2, Column 23, Line 27, delete "Pas/hour" and insert -- Pa·s/hour --, therefor.

Claim 3, Column 23, Line 30, delete "Pas/hour" and insert -- Pa·s/hour --, therefor.

Signed and Sealed this  
Twenty-second Day of September, 2020

Andrei Iancu  
*Director of the United States Patent and Trademark Office*